(12) United States Patent
Lin et al.

(10) Patent No.: US 8,874,557 B2
(45) Date of Patent: Oct. 28, 2014

(54) OBJECT RETRIEVAL AND LOCALIZATION USING A SPATIALLY-CONSTRAINED SIMILARITY MODEL

(75) Inventors: Zhe Lin, Fremont, CA (US); Jonathan W. Brandt, Santa Cruz, CA (US); Xiaohui Shen, Evanston, IL (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/552,595

(22) Filed: Jul. 18, 2012

(65) Prior Publication Data

US 2013/0060765 A1     Mar. 7, 2013

Related U.S. Application Data

(60) Provisional application No. 61/530,895, filed on Sep. 2, 2011.

(51) Int. Cl.
*G06F 17/30* (2006.01)
*G06F 7/00* (2006.01)
*G06K 9/46* (2006.01)
*G06K 9/62* (2006.01)
*G06Q 30/02* (2012.01)

(52) U.S. Cl.
CPC ........ *G06F 17/30259* (2013.01); *G06K 9/4676* (2013.01); *G06F 17/3025* (2013.01); *G06F 17/30265* (2013.01); *G06F 17/30262* (2013.01); *G06F 17/3028* (2013.01); *G06K 9/6212* (2013.01); *G06F 17/30256* (2013.01); *G06Q 30/02* (2013.01); *G06K 9/6211* (2013.01)
USPC ........................................................ 707/723

(58) Field of Classification Search
USPC ........................................................ 707/723
See application file for complete search history.

(56) References Cited

U.S. PATENT DOCUMENTS

| 4,790,564 A | 12/1988 | Larcher et al. |
| 5,579,471 A | 11/1996 | Barber et al. |
| 5,911,139 A | 6/1999 | Jain et al. |

(Continued)

FOREIGN PATENT DOCUMENTS

GB          2388761          1/2004

OTHER PUBLICATIONS

J. Sivic and A. Zisserman. Video google: A text retrieval approach to object matching in videos. IEEE, In ICCV, 2003, 8 pages.

(Continued)

*Primary Examiner* — Kuen Lu
(74) *Attorney, Agent, or Firm* — Wolfe-SBMC

(57) ABSTRACT

Methods, apparatus, and computer-readable storage media for object retrieval and localization that employ a spatially-constrained similarity model. A spatially-constrained similarity measure may be evaluated by a voting-based scoring technique. Object retrieval and localization may thus be achieved without post-processing. The spatially-constrained similarity measure may handle object rotation, scaling and view point change. The similarity measure can be efficiently calculated by the voting-based method and integrated with inverted files. The voting-based scoring technique may simultaneously retrieve and localize a query object in a collection of images such as an image database. The object retrieval and localization technique may, for example, be implemented with a k-nearest neighbor (k-NN) re-ranking method in or as a retrieval method, system or module. The k-NN re-ranking method may be applied to improve query results of the object retrieval and localization technique.

20 Claims, 19 Drawing Sheets

(56) References Cited

U.S. PATENT DOCUMENTS

| | | | |
|---|---|---|---|
| 6,035,055 A | 3/2000 | Wang et al. | |
| 6,480,840 B2 | 11/2002 | Zhu et al. | |
| 6,483,938 B1 | 11/2002 | Hennessey et al. | |
| 6,563,959 B1 | 5/2003 | Troyanker | |
| 6,594,386 B1 | 7/2003 | Golshani et al. | |
| 6,691,126 B1 | 2/2004 | Syeda-Mahmood | |
| 6,757,686 B1 | 6/2004 | Syeda-Mahmood et al. | |
| 6,990,233 B2 | 1/2006 | Park et al. | |
| 7,320,000 B2 | 1/2008 | Chitrapura et al. | |
| 7,702,673 B2 | 4/2010 | Hull et al. | |
| 7,756,341 B2 | 7/2010 | Perronnin | |
| 7,899,252 B2 | 3/2011 | Boncyk et al. | |
| 7,962,128 B2 | 6/2011 | Neven et al. | |
| 8,055,103 B2 | 11/2011 | Fu et al. | |
| 8,401,292 B2 | 3/2013 | Park et al. | |
| 8,429,168 B1 | 4/2013 | Chechik et al. | |
| 8,442,321 B1 | 5/2013 | Chang et al. | |
| 8,472,664 B1 | 6/2013 | Jing et al. | |
| 8,478,052 B1 | 7/2013 | Yee et al. | |
| 8,781,255 B2 | 7/2014 | Lin et al. | |
| 8,805,116 B2 | 8/2014 | Lin et al. | |
| 2002/0050094 A1 | 5/2002 | Taulbee | |
| 2002/0168117 A1 | 11/2002 | Lee et al. | |
| 2002/0184203 A1 | 12/2002 | Nastar et al. | |
| 2004/0002931 A1 | 1/2004 | Platt et al. | |
| 2004/0062435 A1 | 4/2004 | Yamaoka et al. | |
| 2004/0103101 A1* | 5/2004 | Stubler et al. | 707/100 |
| 2004/0190613 A1 | 9/2004 | Zhu et al. | |
| 2005/0105792 A1* | 5/2005 | Cao et al. | 382/145 |
| 2005/0259737 A1 | 11/2005 | Chou et al. | |
| 2006/0112042 A1 | 5/2006 | Platt et al. | |
| 2006/0204079 A1* | 9/2006 | Yamaguchi | 382/154 |
| 2006/0290950 A1 | 12/2006 | Platt et al. | |
| 2007/0127813 A1 | 6/2007 | Shah | |
| 2007/0179921 A1 | 8/2007 | Zitnick et al. | |
| 2008/0199044 A1 | 8/2008 | Tsurumi | |
| 2008/0304743 A1 | 12/2008 | Tang et al. | |
| 2009/0210413 A1 | 8/2009 | Hayashi et al. | |
| 2009/0232409 A1 | 9/2009 | Marchesootti | |
| 2009/0297032 A1 | 12/2009 | Loui et al. | |
| 2009/0299999 A1 | 12/2009 | Loui et al. | |
| 2010/0166339 A1* | 7/2010 | Gokturk et al. | 382/305 |
| 2010/0169323 A1 | 7/2010 | Liu et al. | |
| 2010/0191722 A1 | 7/2010 | Boiman et al. | |
| 2010/0208983 A1 | 8/2010 | Iwai et al. | |
| 2011/0040741 A1 | 2/2011 | Korte et al. | |
| 2011/0075927 A1 | 3/2011 | Xu et al. | |
| 2011/0115921 A1 | 5/2011 | Wang et al. | |
| 2011/0116711 A1 | 5/2011 | Wang et al. | |
| 2011/0143707 A1 | 6/2011 | Darby, Jr. et al. | |
| 2011/0150320 A1 | 6/2011 | Ramalingam et al. | |
| 2011/0182477 A1 | 7/2011 | Tamrakar et al. | |
| 2011/0235923 A1 | 9/2011 | Weisenburger et al. | |
| 2011/0293187 A1 | 12/2011 | Sarkar et al. | |
| 2011/0314049 A1* | 12/2011 | Poirier et al. | 707/769 |
| 2012/0117069 A1 | 5/2012 | Kawanishi et al. | |
| 2012/0158685 A1 | 6/2012 | White et al. | |
| 2012/0158716 A1 | 6/2012 | Zwol et al. | |
| 2012/0170804 A1 | 7/2012 | Lin et al. | |
| 2012/0243789 A1 | 9/2012 | Yang et al. | |
| 2012/0294477 A1 | 11/2012 | Yang et al. | |
| 2013/0060766 A1 | 3/2013 | Lin | |
| 2013/0121570 A1 | 5/2013 | Lin | |
| 2013/0121600 A1 | 5/2013 | Lin | |
| 2013/0132377 A1 | 5/2013 | Lin et al. | |
| 2013/0163874 A1 | 6/2013 | Schechtman et al. | |
| 2013/0273968 A1 | 10/2013 | Rhoads et al. | |
| 2014/0003719 A1 | 1/2014 | Bai et al. | |
| 2014/0010407 A1 | 1/2014 | Sinha et al. | |

OTHER PUBLICATIONS

J. Philbin, O. Chum, M. Isard, J. Sivic, and A. Zisserman. Object retrieval with large vocabularies and fast spatial matching. In CVPR, 2007, 8 pages.
Z. Wu, Q. Ke, M. Isard, and J. Sun. Bundling features for large scale partial-duplicate web image search. In CVPR, 2009, Microsoft Research, 8 pages.
Z. Lin and J. Brandt. A local bag-of-features model for large-scale object retrieval. In ECCV, 2010, Springer-Verlag Berlin Heidelberg, pp. 294-308.
Y. Cao, C. Wang, Z. Li, L. Zhang, and L. Zhang. Spatial-bag-of-features. IEEE, In CVPR, 2010, 8 pages.
O. Chum and J. Matas. Unsupervised discovery of co-occurrence in sparse high dimensional data. In CVPR, 2010, 8 pages.
O. Chum, A. Mikulik, M. Perd'och, and J. Matas. Total recall II: Query expansion revisited. In CVPR, 2011, pp. 889-896.
O. Chum, M. Perd'och, and J. Matas. Geometric min-hashing: Finding a (thick) needle in a haystack. IEEE, In CVPR, 2009, pp. 17-24.
O. Chum, J. Philbin, J. Sivic, M. Isard, and A. Zisserman. Total recall: Automatic query expansion with a generative feature model for object retrieval. In ICCV, 2007, 8 pages.
H. Jegou, M. Douze, and C. Schmid. Hamming embedding and weak geometric consistency for large scale image search. In ECCV, 2008, Author manuscript, published in "10th European Conference on Computer Vision (ECCV '08) 5302 (2008) 304-317".
H. Jegou, M. Douze, and C. Schmid. On the burstiness of visual elements. In CVPR, 2009, Author manuscript, published in "IEEE Conference on Computer Vision and Pattern Recognition (CVPR '09) (2009) 1169-1176".
H. Jegou, M. Douze, C. Schmid, and P. Perez. Aggregating local descriptors into a compact image representation. In CVPR, Author manuscript, published in 23rd IEEE Conference on Computer Vision & Pattern Recognition (CVPR '10) (2010) 3304-3311.
H. Jegou, H. Harzallah, and C. Schmid. A contextual dissimilarity measure for accurate and efficient image search. In CVPR, 2007, Author manuscript, published in Conference on Computer Vision & Pattern Recognition (CVPR '07) (2007) 1-8.
H. Jegou, C. Schmid, H. Harzallah, and J. Verbeek. Accurate image search using the contextual dissimilarity measure. Author manuscript, published in IEEE Transactions on Pattern Analysis and Machine Intelligence 32, 1 (2010) 2-11.
C. H. Lampert. Detecting objects in large image collections and videos by efficient subimage retrieval. In ICCV, 2009, 8 pages.
D. G. Lowe. Distinctive image features from scale-invariant keypoints. IJCV, 60(2):91-110, Received Jan. 10, 2003; Revised Jan. 7, 2004; Accepted Jan. 22, 2004, 2004, 20 pages.
A. Mikulik, M. Perd'och, O. Chum, and J. Matas. Learning a fine vocabulary. In ECCV, 2010, 14 pages.
M. Muja and D. G. Lowe. Fast approximate nearest neighbors with automatic algorithm configuration. In VISAPP, 2009, 10 pages.
D. Nister and H. Stewenius. Scalable recognition with a vocabulary tree. In CVPR, 2006, 8 pages.
M. Perd'och, O. Chum, and J. Matas. Efficient representation of local geometry for large scale object retrieval. In CVPR, 2009, 8 pages.
J. Philbin, O. Chum, M. Isard, J. Sivic, and A. Zisserman. Lost in quantization: Improving particular object retrieval in large scale image databases. In CVPR, 2008, 8 pages.
J. Philbin, M. Isard, J. Sivic, and A. Zisserman. Descriptor learning for efficient retrieval. In ECCV, 2010, 14 pages.
D. Qin, S. Gammeter, L. Bossard, T. Quack, and L. VanGool. Hello neighbor: accurate object retrieval with k-reciprocal nearest neighbors. In CVPR, 2011, 8 pages.
J. Yuan, Y. Wu, and M. Yang. Discovery of collocation patterns: from visual words to visual phrases. IEEE, In CVPR, 2007, 8 pages.
Y. Zhang, Z. Jia, and T. Chen. Image retrieval with geometry-preserving visual phrases. In CVPR, 2011, pp. 809-816.
U.S. Appl. No. 12/869,460, filed Aug. 26, 2010, Zhe Lin, et al.
U.S. Appl. No. 13/434,061, filed Mar. 29, 2012, Zhe Lin, et al.
U.S. Appl. No. 13/434,028, filed Mar. 29, 2012, Zhe Lin, et al.
Google Mobile, "Coogle Goggles," downloaded from http://www.google.com/mobile/goggles/#text on Sep. 28, 2012, (c)2011 Google, 1 page.
Amazon, "A9.com Innovations in Search Technologies—Flow," downloaded from http://flow.a9.com on Sep. 28, 2012, (c) 2003-2011 A9.com, Inc. 1 page.

(56) References Cited

OTHER PUBLICATIONS

Xiaohui Shen, et al., "Object retrieval and localization with spatially-constrained similarity measure and k-NN reranking," Jun. 16-21, 2012, 2012 IEEE Conference on Computer Vision and Pattern Recognition (CVPR), pp. 1-8.
Tom Yeh, et al., "Fast concurrent object localization and recognition," In: CVPR. 2009 IEEE, pp. 280-287.
Opelt, A., Zisserman, A.: A boundary fragment model for object detection. In: ECCV. (2006), pp. 1-14.
Griffin, G., Holub, A., Perona, P., "Caltech-256 object category dataset," Technical Report 7694, California Institute of Technology (2007), pp. 1-20.
Wu, B., Nevatia, R.: Simultaneous object detection and segmentation by boosting local shape feature based classifier. In: CVPR. (2007), pp. 1-8.
Jing, Y., Baluja, S.: Pagerank for product image search. In: WWW 2008 / Refereed Track: Rich Media (2008), pp. 1-9.
Lin, X., Gokturk, B., Sumengen, B., Vu, D.: Visual search engine for product images. In: Multimedia Content Access: Algorithms and Systems II. 2008 SPIE Digital Library, pp. 1-9.
Bourdev, L.D., Malik, J.: Poselets: Body part detectors trained using 3d human pose annotations. In: ICCV. (2009), pp. 1-8.
Rother, C., Kolmogorov, V., Minka, T., Blake, A.: Cosegmentation of image pairs by histogram matchingincorporating a global constraint into mrfs. In: CVPR. (2006), pp. 1-8.
Rother, C., Kolmogorov, V., Blake, A.: Grabcut: Interactive foreground extraction using iterated graph cuts. In: SIGGRAPH. (2004), pp. 1-6.
Batra, D., Kowdle, A., Parikh, D., Luo, J., Chen, T.: icoseg: Interactive cosegmentation with intelligent scribble guidance. In: CVPR. (Jun. 13-18, 2010), pp. 1-8.
U.S. Appl. No. 13/624,615, filed Sep. 21, 2012, Zhe Lin, et al.
U.S. Appl. No. 13/552,596, filed Jul. 18, 2012, Zhe Lin, et al.
He, J., Lin, T.H., Feng, J., Chang, S.F., "Mobile product search with bag of hash bits,". In: ACM MM. (2011), pp. 1-8.
Wang, X., Yang, M., Cour, T., Zhu, S., Yu, K., Han, T.X.: Contextual weighting for vocabulary tree based image retrieval. In: ICCV. (2011), pp. 1-8.
Girod, B., Chandrasekhar, V., Chen, D., Cheung, N.M., Grzeszczuk, R., Reznik, Y., Takacs, G., Tsai, S., Vedantham, R.: Mobile visual search. IEEE Signal Processing Magazine 28 (2011), pp. 1-11.
Chandrasekhar, V., Chen, D., Tsai, S., Cheung, N.M., Chen, H., Takacs, G., Reznik, Y., Vedantham, R., Grzeszczuk, R., Bach, J., Girod, B.: The stanford mobile visual search dataset. In: ACM Multimedia Systems Conference. (2011), pp. 1-6.
Brox, T., Bourdev, L.D., Maji, S., Malik, J.: Object segmentation by alignment of poselet activations to image contours. In: CVPR. (2011), pp. 2225-2232.
Bastian Leibe, et al., "Combined Object Categorization and Segmentation with an Implicit Shape Model," in ECCV'04 Workshop on Statistical Learning in Computer Vision, Prague, May 2004, pp. 1-16.
"Final Office Action", U.S. Appl. No. 12/869,460, (Dec. 14, 2012), 17 pages.
"Non-Final Office Action", U.S. Appl. No. 12/869,460, (Jun. 18, 2012), 13 pages.
"Non-Final Office Action", U.S. Appl. No. 12/869,460, (Sep. 24, 2013), 18 pages.
"Non-Final Office Action", U.S. Appl. No. 13/552,596, (Aug. 6, 2013),11 pages.
Fulkerson, et al., "Localizing Objects with Smart Dictionaries", *Proceedings of the 10th European conference on Computer Vision: Part I*, (Oct. 2008), pp. 179-192.
Grauman, Kristen "Indexing with local features, Bag of words models", *UT-Austin*. Retrieved from <http://www.cs.utexas.edu/~grauman/courses/fall2009/slides/lecture16_bow.pdf>, (Oct. 29, 2009), 39 pages.
Lazebnik, Svetlana et al., "Beyond Bags of Features: Spatial Pyramid Matching for Recognizing Natural Scene Categories", *CVPR* (Jun. 2006), 8 pages.
"Final Office Action", U.S. Appl. No. 13/552,596, (Dec. 26, 2013), 14 pages.
"Non-Final Office Action", U.S. Appl. No. 13/434,028, (Oct. 1, 2013), 22 pages.
"Non-Final Office Action", U.S. Appl. No. 13/434,061, (Oct. 23, 2013), 25 pages.
Jegou, et al., "Improving bag-of-features for large scale image search", *International Journal of Computer Vision*, vol. 87 Issue 3, (Mar. 15, 2011), 21 pages.
Vailaya, et al., "Image Classification for Content-Based Indexing", *IEEE Transactions on Image Processing*, vol. 10 Issue 1, (Jan. 2001), pp. 117-130.
"Final Office Action", U.S. Appl. No. 12/869,460, Dec. 31, 2013, 20 pages.
"Non-Final Office Action", U.S. Appl. No. 13/624,615, Feb. 6, 2014, 15 pages.
"Notice of Allowance", U.S. Appl. No. 13/434,061, Mar. 12, 2014, 8 pages.
Albuz, et al.,' "Scalable Color Image Indexing and Retrieval Using Vector Wavelets", IEEE Transactions on Knowledge and Data Engineering, vol. 13, No. 5,, Sep. 2001, pp. 851-861.
"Non-Final Office Action", U.S. Appl. No. 13/552,596, Jul. 22, 2014, 13 pages.
"Notice of Allowance", U.S. Appl. No. 13/624,615, Jul. 25, 2014, 7 pages.

\* cited by examiner rotation translation / view point change scale change non-rigid deformation

OBJECT RETRIEVAL AND LOCALIZATION USING A SPATIALLY-CONSTRAINED SIMILARITY MODEL

PRIORITY INFORMATION

This application claims benefit of priority of U.S. Provisional Application Ser. No. 61/530,895 entitled "OBJECT RETRIEVAL AND LOCALIZATION TECHNIQUES" filed Sep. 2, 2011, the content of which is incorporated by reference herein in its entirety.

BACKGROUND

Image and object retrieval has been an active research topic for decades due to its desired applications in, for example, web image search, mobile visual search and personal photo management. Many conventional retrieval techniques adopt the bag-of-words model. FIG. 1 illustrates a bag-of-words framework for large-scale image search given a collection of images 100 and a query image 102. In this model, a visual vocabulary 104 is built by clustering on a large collection of local features such as SIFT. In the retrieval stage, each extracted feature from the query image 102 is assigned to its closest visual word in the vocabulary 104. The query image 102 is accordingly represented by a global histogram 106 of such visual words, and matched with database images 100 according to tf-idf (term frequency-inverse document frequency) weighting.

A fundamental problem in object retrieval techniques using the bag-of-words model is its lack of spatial information. Various techniques have been proposed to incorporate spatial constraints into the bag-of-words model to improve the retrieval accuracy. However, these techniques tend to be too strict or only encode weak constraints so that they only partially solve the problem for limited cases. While the bag-of-words model works generally well benefiting from its effective feature presentation and indexing schemes with inverted files, it still suffers from problems including but not limited to, the loss of information (especially spatial information) when representing the images as histograms of quantized features, and the deficiency of feature discriminative power, either because of the degradation caused by feature quantization, or due to its intrinsic incapability to tolerate large variation of object appearance.

tf-idf

The tf-idf weight (term frequency-inverse document frequency) is a weight that may be used in information retrieval and text mining. This weight is a statistical measure used, for example, to evaluate how important a word is to a document in a collection or corpus. Variations of the tf-idf weighting scheme may, for example, be used by search engines as a central tool in scoring and ranking a document's relevance given a user query.

SUMMARY

Various embodiments of methods, apparatus, and computer-readable storage media for object retrieval and localization are described. An object retrieval and localization technique is described that may employ a spatially-constrained similarity model that includes a spatially-constrained similarity measure that may better incorporate spatial information in the bag-of-words model than conventional methods. The spatially-constrained similarity measure may, for example, handle object rotation, scaling, view point (translation) change, and appearance deformation. In at least some embodiments, the spatially-constrained similarity measure may be formulated according to a tf-idf (term frequency-inverse document frequency) weighting technique and may be calculated and evaluated by a voting-based scoring technique to simultaneously retrieve and localize a query object in a collection of images such as an image database. Accurate object retrieval and localization are thus simultaneously achieved. In at least some embodiments, in the spatially-constrained similarity model, only those matched feature pairs with spatial consistency (i.e., roughly coincident feature locations under some similarity transformation) are considered. This similarity measure can readily handle object rotation, translation, and scale change, and also performs well with object deformation. Embodiments of the voting-based scoring technique may efficiently calculate the similarity measure with low extra memory and searching time. Moreover, the technique can accurately localize the object in each retrieved image in the initial search step without spatial verification or other post-processing steps.

In the spatially-constrained similarity measure, only the matched visual word pairs with spatial consistency (i.e., roughly coincident feature locations under some similarity transformation) are considered. In other words, the similarity measure is designed to handle object rotation, translation and scaling, and performs well with moderate object deformation. The voting-based scoring technique may be based on a Hough transform method, and may efficiently calculate the similarity measure with low extra memory and search time. Embodiments of the object retrieval and localization technique, using the voting-based scoring technique to evaluate the spatially-constrained similarity measure, can simultaneously localize the object with high accuracy in each retrieved image in an initial search step. In addition, embodiments of the object retrieval and localization technique can robustly retrieve and localize non-rigid objects such as faces or human bodies.

Embodiments of the object retrieval and localization technique may, for example, be implemented with a k-nearest neighbor (k-NN) re-ranking method in or as a retrieval method, system or module. The k-NN re-ranking method may be used to improve query results of the object retrieval and localization technique.

Figure 1:
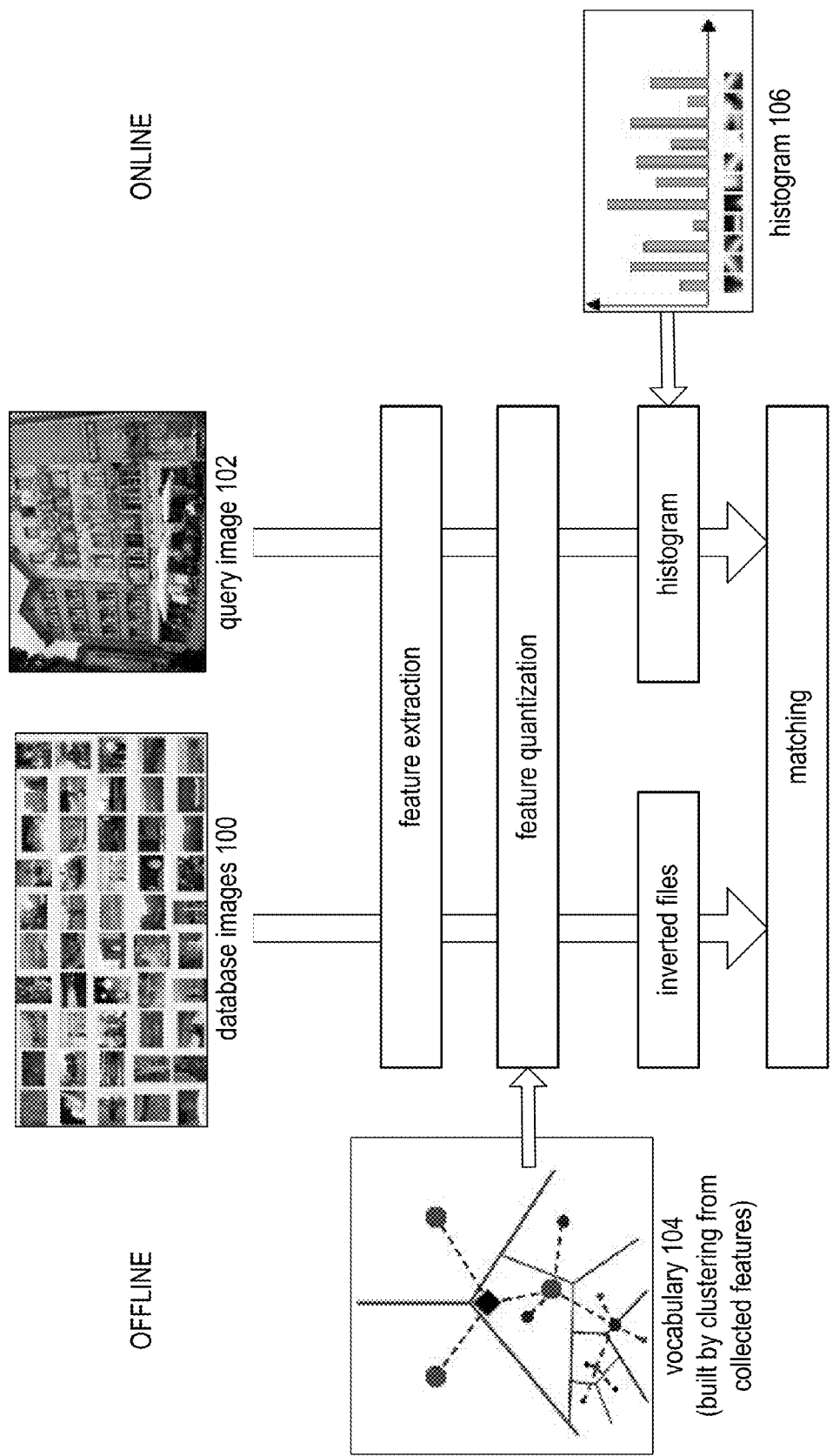
FIG. 1 illustrates the bag-of-words framework for large-scale image search.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and computer-readable storage media for object retrieval and localization using a spatially-constrained similarity model and for k-nearest neighbor (k-NN) re-ranking are described. In the image and object retrieval scenario, some conventional techniques try to localize the object by sub-image search. However, sub-image search is relatively slow when the database is large. This is also the gap between object detection techniques and fast object retrieval applications. The object retrieval and localization technique described herein may bridge this gap by simultaneously localizing the object during object retrieval without additional cost. The k-NN re-ranking technique described herein may, for example, be applied to improve search results generated by an embodiment of the object retrieval and localization technique. However, note that the k-NN re-ranking technique may be employed to re-rank search results generated according to other techniques.

Figure 2:
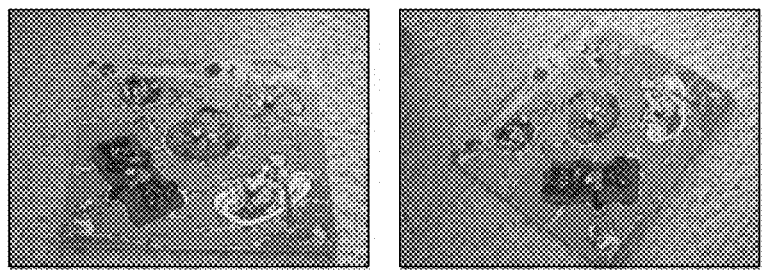
FIG. 2 shows examples of object rotation, translation, scale change, and object deformation.
Figure 2:
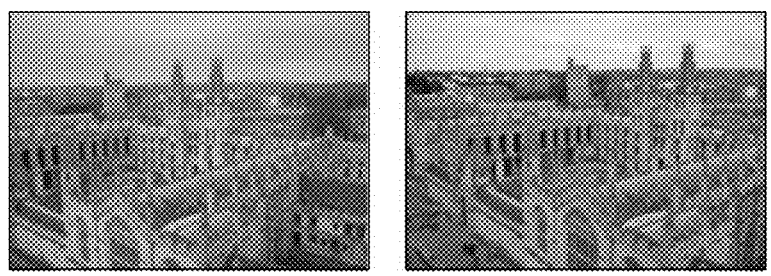
Figure 2:
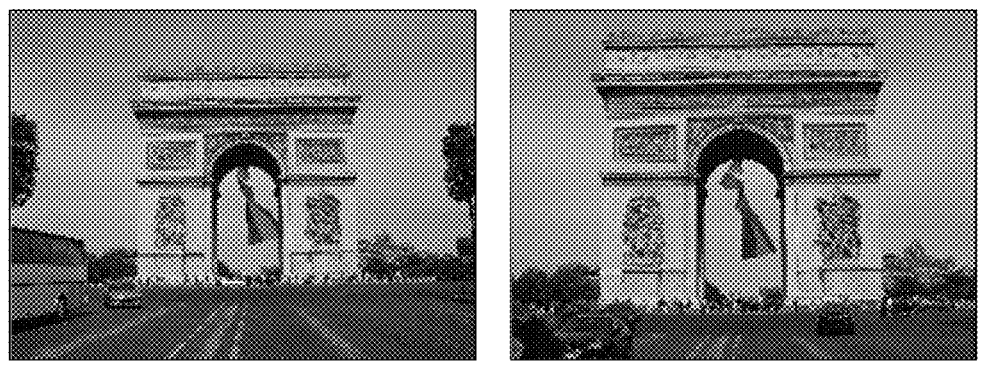
Figure 2:
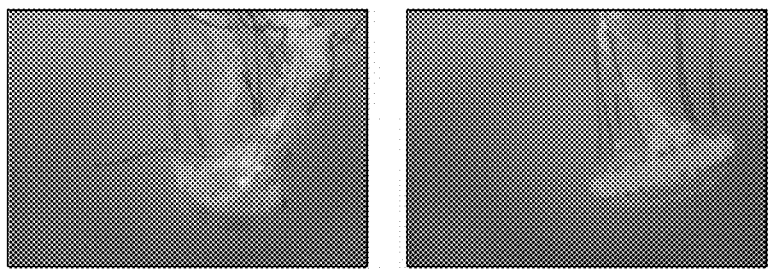

An object retrieval and localization technique is described that may employ a spatially-constrained similarity model that includes a spatially-constrained similarity measure that may better incorporate spatial information in the bag-of-words model than conventional methods. The spatially-constrained similarity measure may, for example, handle object rotation, scaling, view point (translation) change, and appearance deformation. In at least some embodiments, the spatially-constrained similarity measure may be formulated according to a tf-idf (term frequency-inverse document frequency) weighting technique and may be calculated and evaluated by a voting-based scoring technique to simultaneously retrieve and localize a query object in a collection of images such as an image database. Accurate object retrieval and localization are thus simultaneously achieved. In at least some embodiments, in the spatially-constrained similarity model, only those matched feature pairs with spatial consistency (i.e., roughly coincident feature locations under some similarity transformation) are considered. This similarity measure can readily handle object rotation, translation, and scale change, and also performs well with object deformation. See FIG. 2 for examples of object rotation, translation, scale change, and object deformation. Embodiments of the voting-based scoring technique may efficiently calculate the similarity measure with low extra memory and searching time. Moreover, the technique can accurately localize the object in each retrieved image in the initial search step without spatial verification or other post-processing steps.

In the spatially-constrained similarity measure, only the matched visual word pairs with spatial consistency (i.e., roughly coincident feature locations under some similarity transformation) are considered. In other words, the similarity measure is designed to handle object rotation, translation and scaling, and performs well with moderate object deformation. The voting-based scoring technique may be based on a Hough transform method, and may efficiently calculate the similarity measure with low extra memory and search time. Embodiments of the object retrieval and localization technique, using the voting-based scoring technique to evaluate the spatially-constrained similarity measure, can simultaneously localize the object with high accuracy in each retrieved image in an initial search step. In addition, embodiments of the object retrieval and localization technique can robustly retrieve and localize non-rigid objects such as faces or human bodies. See FIG. 14 for example results of object retrieval and localization for a non-rigid object.

In addition, embodiments of a k-nearest neighbor (k-NN) re-ranking method are described that may leverage a query's k-nearest neighbors to improve query results. The k-NN re-ranking method may, for example, be used with the object retrieval and localization technique to improve the retrieval results based on the images and localized objects retrieved by the technique. Given the top k retrieved images and their localized objects, each k-NN object may be used as a query to perform a search. A database image may have different ranks when using those k-nearest neighbors as queries. Accordingly, a new score for each database image may be collaboratively determined by those ranks, and re-ranking may be performed using the new scores to improve the search results. The k-NN re-ranking technique may be performed two or more times, each time on a new set of k-nearest neighbors, to further refine the search results. Unlike previous query expansion methods, this k-NN-based score measure discards similarities between images, and depends only on ranks. The k-NN re-ranking technique can successfully retrieve the objects with large variations, while avoiding degradation when there are wrong objects in the k-nearest neighbors. Experimental results show that this technique achieves higher and more robust performance than conventional query expansion techniques.

Figure 3:
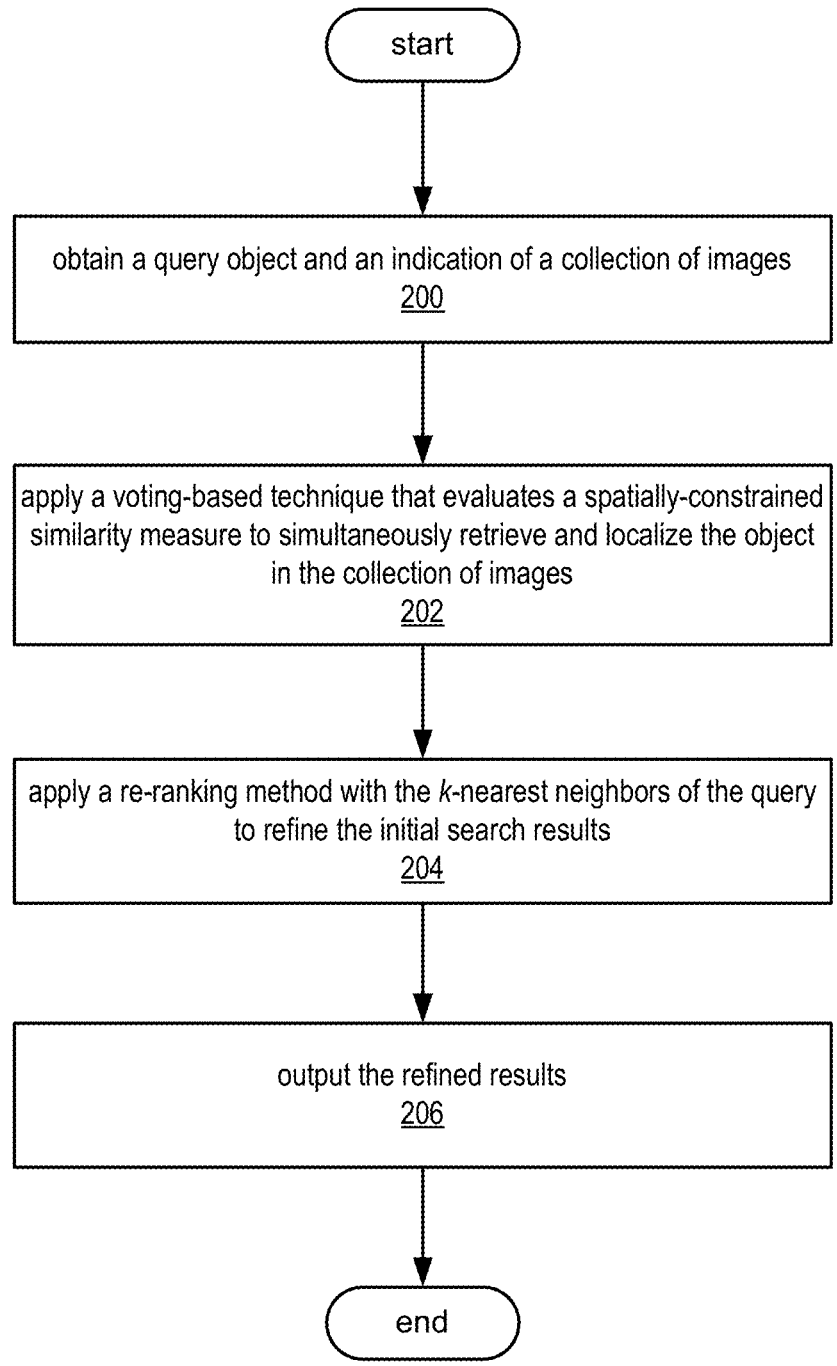
FIG. 3 is a flowchart for a retrieval method that implements an object retrieval and localization technique and a k-NN re-ranking method, according to at least some embodiments.

FIG. 3 is an example flowchart for a retrieval method that implements an object retrieval and localization technique and a k-NN re-ranking method, according to at least some embodiments. As indicated at 200, a query object and an indication of a collection of images (e.g. an image database) may be obtained. The query object may, for example, indicate a region of an image for which matches are desired. As indicated at 202, a voting-based technique may be applied that evaluates a spatially-constrained similarity measure and that simultaneously retrieves and localizes the object in the collection of images. The spatially-constrained similarity measure may, for example, handle object rotation, scaling, view point (translation) change, and appearance deformation. See, for example, the section titled Spatially constrained similarity measure for details of the similarity measure, and the section titled Voting-based localization for details of the voting-based technique. As indicated at 204, a re-ranking method with the k-nearest neighbors of the query (i.e., k-NN re-ranking) may be applied to refine the initial search results. In at least some embodiments, the k-NN re-ranking method may be iteratively applied to further refine the results. See, for example, the section titled k-NN re-ranking for details of this technique. As indicated at 206, the refined search results may be output.

Embodiments of the object retrieval and localization technique and the k-NN re-ranking method may be implemented together in or as a retrieval method, system or module. In some embodiments of such a retrieval system, other components such as soft assignment in feature quantization and learned vocabulary may also be implemented to perform object and image retrieval. However, the object retrieval and localization technique may be implemented independently of the k-NN re-ranking method, and vice versa. For example, in some implementations, embodiments of the object retrieval and localization technique may be implemented to retrieve objects and/or images without implementing or applying the k-NN re-ranking method to improve the results of the search. As another example, embodiments of the k-NN re-ranking method may be used with or applied to search results of any of various other techniques that perform searches of collections of items (files, images, objects, words, phrases, etc) to improve the results of particular searches, or may be used in other applications.

Thus, methods, apparatus, and computer-readable storage media are described that may include one or more of, but are not limited to:

Embodiments of a spatially-constrained similarity measure that handles general object transformations, and which improves retrieval performance when compared to conventional techniques.

Embodiments of a voting-based technique that evaluates the similarity measure and that simultaneously retrieves and localizes the object in the database images.

Embodiments of a re-ranking method with the k-nearest neighbors (k-NN) of the query to refine search results, which may achieve better performance in common evaluation benchmarks when compared to conventional techniques.

Each of these features is further described in the sections below.

Object Retrieval and Localization Technique

This section describes embodiments of a method for object similarity ranking and localization, referred to herein as an object retrieval and localization technique, that employs a spatially constrained similarity measure and a voting-based scoring technique that evaluates the similarity measure and localizes objects in images. Embodiments of the object retrieval and localization technique may simultaneously retrieve and localize a query object in the images in an image collection such as an image database. Embodiments of the object retrieval and localization technique may also be employed to rank images in regard to similarity to a query image in an image collection such as an image database.

Figure 4:
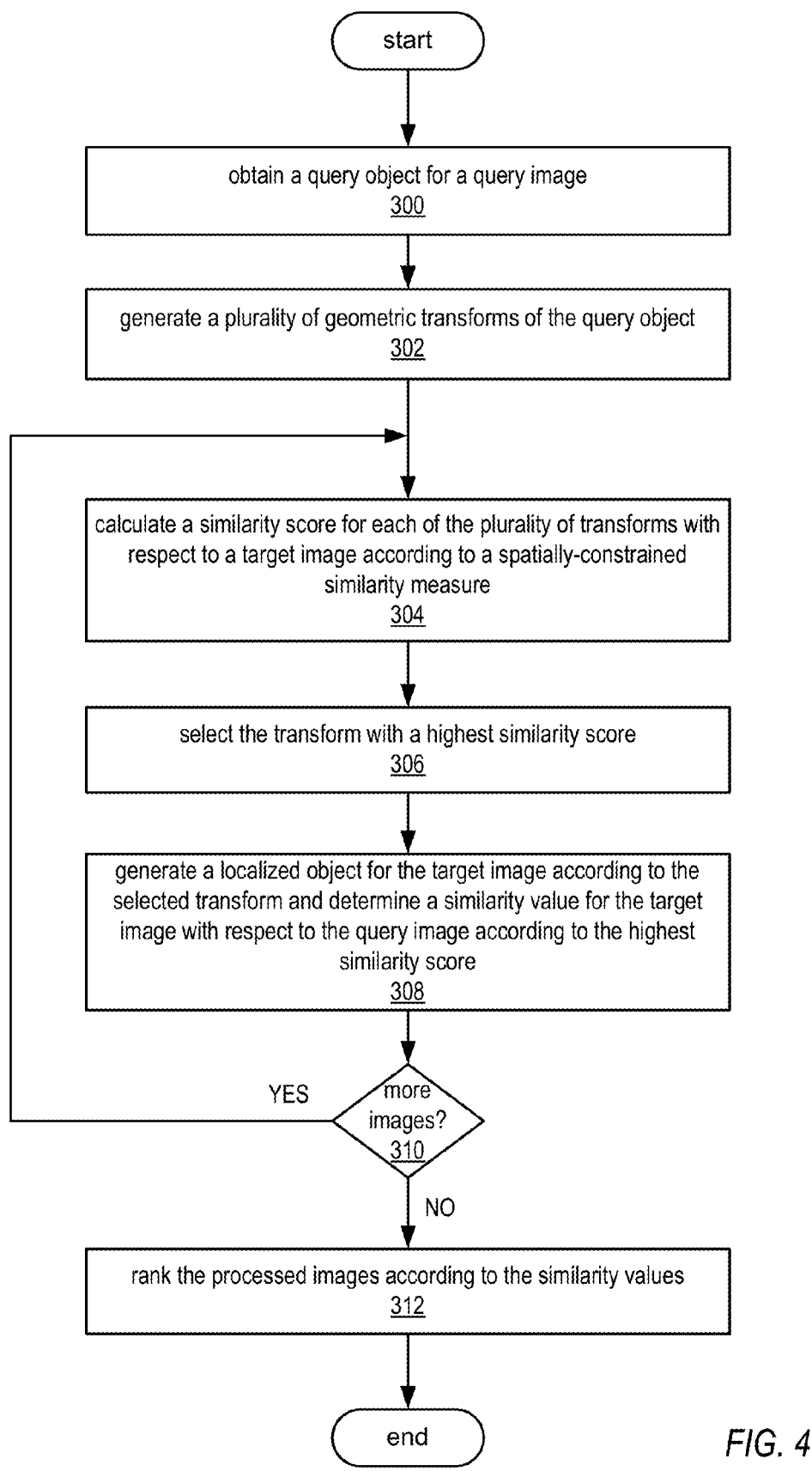
FIG. 4 is a flowchart for an object retrieval and localization method, according to at least some embodiments.

FIG. 4 is a flowchart for an object retrieval and localization method, according to at least some embodiments. As indicated at 300, a query object for a query image may be obtained. In at least some embodiments, the query object may be represented by a bounding box or rectangle within the query image. Indications of a plurality of features of the query image located within the bounding box may also be obtained.

As indicated at 302, a plurality of geometric transforms may be generated from the query object. In at least some embodiments, generating the geometric transforms may involve rotating and scaling the query object according to each combination of a plurality of rotation angles and a plurality of scales.

As indicated at 304, a similarity score may be calculated for each of the plurality of transforms with respect to a target image according to a spatially-constrained similarity measure that accounts for rotation, translation, and scale. In at least some embodiments, to calculate the similarity score for the transforms according to the spatially-constrained similarity measure, two or more features in the target image may be matched to the features of the query object to generate two or more feature pairs. A voting map is generated for each of the transforms according to the feature pairs. The voting map accumulates a voting score, calculated for each feature pair, for a translated location of a center of an object in the target image that matches the query object. In at least some embodiments, the voting score may be calculated according to a tf-idf (term frequency-inverse document frequency) weighting technique. The voting map is then used to select the translated location for the center of the object with respect to the current transform. The accumulated voting score in each voting map indicates the similarity score for the respective transform.

As indicated at 306, the transform with a highest similarity score may be selected. The transform with the highest similarity score indicates a localized object in the target image that best matches the query object. As indicated at 308, a localized object may be generated for the target image according to the selected transform. In addition, a similarity value for the target image with respect to the query image may be determined according to the highest similarity score and recorded.

At 310, if there are more images to be searched, then the method may return to element 304 to process the next target image. Note that, in at least some embodiments, two or more target images may be processed according to elements 304 through 308 in parallel.

Thus, elements 304 through 308 may be performed for each of a plurality of images in an image collection or image database. The highest similarity score for each image may be used to determine a similarity value of the respective image to the query image, which may be recorded. As indicated at 312, after all the images have been searched, the images may be ranked according to the indicated similarity of the respective images to the query image.

The elements of the object retrieval and localization method illustrated in FIG. 4 are described in more detail in the following discussion.

Figure 5:
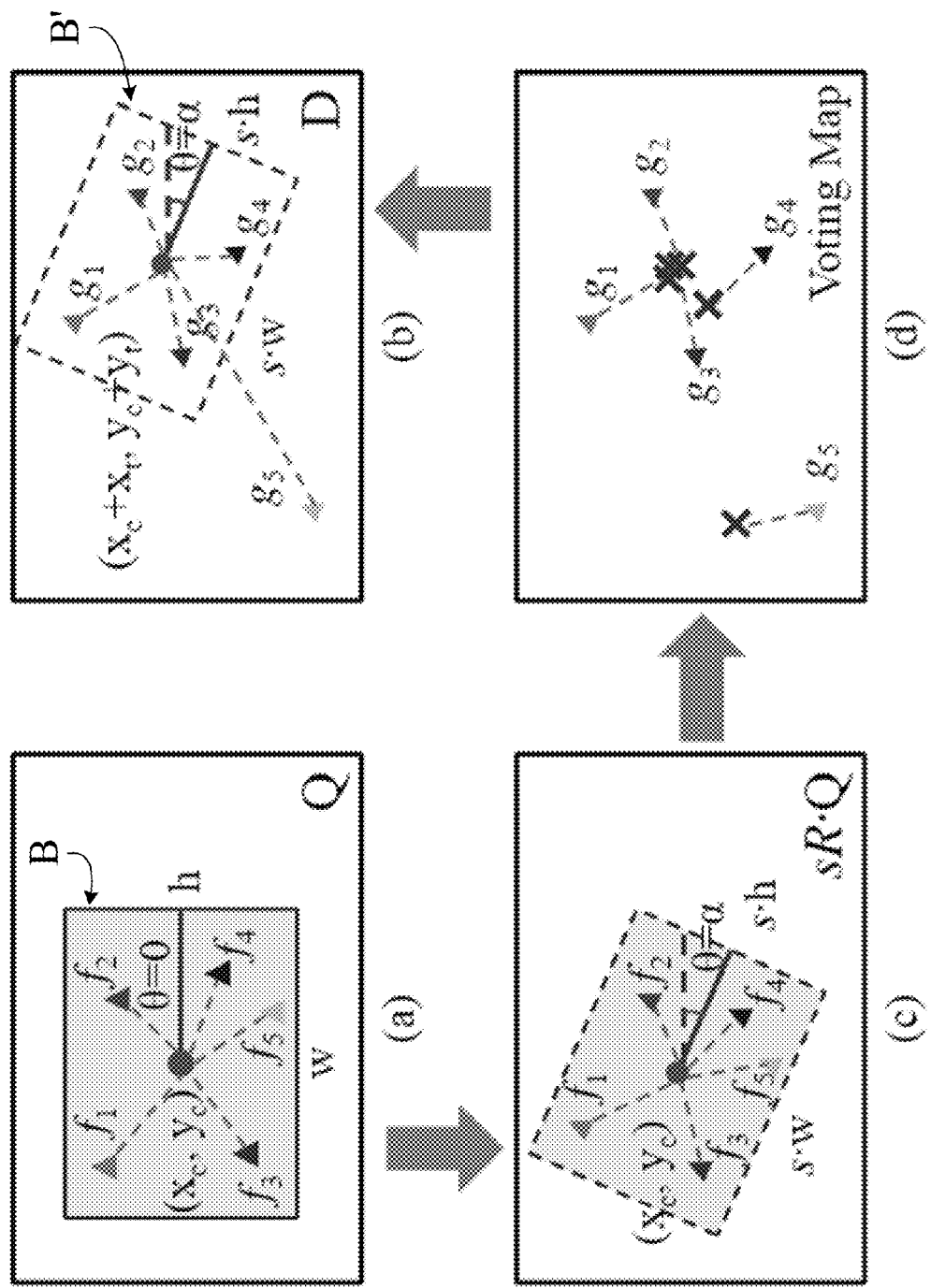
FIG. 5 graphically illustrates the spatially-constrained similarity measure and voting-based scoring technique, according to at least some embodiments.

FIG. 5 is provided to graphically illustrate the spatially-constrained similarity measure and voting-based scoring technique, according to at least some embodiments. FIG. 5 (a) represents a query image with a specified object in the rectangle. FIG. 5 (b) represents an image from an image set (e.g., an image database) that contains the same object with a certain geometric transformation. At FIG. 5 (c), the relative locations of features in the query rectangle are transformed to different scales and rotation angles. At FIG. 5 (d), a voting map is generated according to the relative positions of the matched features with respect to the rectangle center. The transformation parameters (s (scale), α (rotation angle), and t (translation)) with the highest voting score are chosen as the best.

Spatially Constrained Similarity Measure

Referring to FIG. 5 (a), given a query image Q with a specified object, the spatial information of the object can be represented by a bounding box $B=\{x_c, y_c, w, h, \theta\}$, where $(x_c, y_c)$ is the coordinate of the rectangle center, w and h are the width and height of the bounding box respectively, and θ is the rotated angle of the rectangle (θ=0 for the query rectangle). A task is to find the same object with certain degrees of transformation T(B) in a database image D, where T(·) is the transformation. Object rotation, translation and scale change may be considered. Therefore T(·) can be decomposed to three parameters $$T(\cdot)=\{R(\alpha),s,t\},$$

where α is the rotated angle of the object and $$R(\alpha) = \begin{bmatrix} \cos\alpha & -\sin\alpha \\ \sin\alpha & \cos\alpha \end{bmatrix}.$$

The parameter s is the scale change, and $t=(x_t, y_t)$ is the translation. Accordingly, the transformed object rectangle in the database image would be $$B'=T(B)=\{x_c+x_t,y_c+y_t,s\cdot w,s\cdot h,\theta=\alpha\}$$

(See, e.g. FIG. 5 (b)). In at least some embodiments, the aspect ratio of the object may be kept fixed as the similarity measure can handle a large range of object deformation and viewpoint changes.

By the above definition, a task is to evaluate the similarity between the query object and a database image by finding a (transformed) sub-rectangle in the database image that best matches the query object, and then sort the database images based on the similarity. To achieve this, a spatially-constrained similarity measure may be defined.

In at least some embodiments, the spatially-constrained similarity measure may be defined as follows. The object rectangle in the query image may be denoted by Q. $\{f_1, f_2, \ldots, f_m\}$ denote the features extracted from Q. Similarly, the database image may be denoted by D, and $\{g_1, g_2, \ldots, g_n\}$ may denote the features in D. Given a transformation T, the similarity between Q and D may be defined as:

$$S(Q, D \mid T) = \sum_{\substack{(f_i,g_j) \\ f_i \in Q, g_j \in D, w(f_i)=w(g_j) \\ \|T(L(f_i))-L(g_j)\|<\varepsilon}} \frac{idf(w(f_i)) \cdot idf(w(g_j))}{tf_Q(w(f_i)) \cdot tf_D(w(g_j))} \quad (1)$$

where w(f) is the assigned visual word for feature f, $L(f)=(x_f, y_f)$ is the 2D image location of feature f, and T(L(f)) is its location in D after the transformation. The spatial constraint $$\|T(L(f_i))-L(g_j)\|<\varepsilon$$

means that, after transformation, the locations of two matched features should be sufficiently close (less than a tolerance parameter ε).

In equation 1, idf(w(f)) is the inverse document frequency of w(f), and $tf_Q(w(f_i))$ is the term frequency (i.e. number of occurrence) of $w(f_i)$ in Q. Similarly, $tf_D(w(g_j))$ is the term frequency of $w(g_j)$ in D. This is a normalization term to penalize those visual words repeatedly appearing in the same image. When repeated patterns (e.g. building facades, windows, water waves, etc.) exist in an image, many features tend to be assigned to the same visual word. Such "burstiness" of visual words violates the assumption in the bag-of-words model that visual words are emitted independently in the image, and therefore could corrupt the similarity measure. As an example, considering that m features in Q and n features in D are quantized to visual word k respectively, there will be m·n matched pairs between two images, some of which may also satisfy the spatial constraint, as they tend to appear in a local neighborhood. However, if features are directly matched without quantization, there should be at most min (m, n) matched pairs. In other words, most of these m·n pairs are invalid correspondences and would largely bias the similarity measure if no normalization is applied.

Since $w(f_i)=w(g_j)$, equation 1 may be simplified to:

$$S(Q, D \mid T) = \sum_{k=1}^{N} \sum_{\substack{(f_i, g_j) \\ f_i \in Q, g_j \in D \\ w(f_i)=w(g_j)=k \\ \|T(L(f_i))-L(g_j)\|<\varepsilon}} \frac{idf^2(k)}{tf_Q(k) \cdot tf_D(k)} \quad (2)$$

where N is the size of the vocabulary, and $tf_Q(k)$ and $tf_D(k)$ are the term frequencies of visual word k in Q and D respectively.

For each database image, a goal is to find the transformation with the highest similarity, i.e.:

$$T^* = \{R(\alpha^*), s^*, t^*\} = \arg\max_T S(Q, D \mid T). \quad (3)$$

As a result, $S^*(Q, D) = S(Q,D|T^*)$ is the similarity score between Q and D.

In at least some embodiments, similarity scores may be calculated for some or all of the images in an image database, and some or all of the database images may then be ranked according to their similarity scores ($S^*(Q,D)$).

In the spatially-constrained similarity measure, only the matched feature pairs that fit the estimated transformation are considered as inliers and thus contribute to the similarity score. FIG. 5 may be used illustrate the similarity measure. In FIGS. 5(a) and 5(b), $w(f_i)=w(g_i)$, but only $\{(f_i, g_i)(i=1, 2, 3)\}$ are spatially consistent with the transformation. $(f_5, g_5)$ is considered a false match. As for $(f_4, g_4)$, the similarity measure may depend on the selection of tolerance parameter $\epsilon$ in equation 2. If relatively large object deformation is allowed, and $\epsilon$ is set relatively high, $(f_4, g_4)$ may be considered as an inlier, otherwise it may be excluded.

Voting-Based Localization

In this section a voting-based technique for finding the best transformation in each database image given the above-defined spatially-constrained similarity measure is described.

To evaluate $S^*(Q,D)$, at least some embodiments may find the transformation $T^*$ that maximizes the similarity score. To perform this, at least some embodiments may use an approximation technique based on discretizing the transformation space, which is decomposed into rotation, scaling and translation. In this technique, the rotation angle space may be quantized to $n_R$ values between 0☐2π. In at least some embodiments, $n_R$=4 or 8, but other values may be used. Thus, the rotation angle space may be decomposed to $n_R$ discrete steps, e.g.:

$$\alpha = 0, \frac{2\pi}{n_R}, \frac{2*2\pi}{n_R}, \ldots, \frac{(n_R-1)*2\pi}{n_R}.$$

Similarly, the scale space is also discretized to $n_s$ values, for example $n_s$=8. In at least some embodiments, only scale changes (also referred to as scale factors) between ½ and 2 are considered, which generally covers most cases.

These discretizations yield a set of $n_R*n_s$ possible transformation hypotheses (up to translation). The query object is then transformed based on each hypothesis, while keeping the location of the rectangle center the same (i.e., no translation).

FIG. 5(c) shows an example of a transformation hypothesis in which the query is rotated and scaled to one of these steps. To perform the transformation, only the relative locations of all the features in the query rectangle need to be recalculated with respect to the center. The object center needs to be kept unmoved, and the relative locations of all the features in the query rectangle with respect to the center may be recalculated, for example using equation 2. In at least some embodiments, this can be efficiently done immediately after query feature extraction on the query image and before search. In at least some embodiments, if a gravity vector assumption is used in query feature extraction, the feature descriptors may need to be recalculated for each rotation angle.

In at least some embodiments, after the query rectangle is transformed to a particular quantized rotation angle and scale, a voting scheme may be used to find the best translation in a target image (e.g., a database image). Consider a matched pair (f, g) between the query Q and a database image D. V(f) denotes the relative location vector from the rotated and scaled location of f to the rectangle center $c_Q$. (f, g) can determine a translation based on their locations, and this translation enforces the possible location of the rectangle center in D to be:

$$L(c_D)=L(g)-V(f).$$

Therefore, given a matched pair, the location of the rectangle center in D can be found, and a voting score for that location can be determined. In at least some embodiments, if $w(f)=w(g)=k$, the voting score for the pair (f, g) may be defined as:

$$\text{Score}(k) = \frac{idf^2(k)}{tf_Q(k) \cdot tf_D(k)} \quad (4)$$

Note that, if matched feature pairs are spatially consistent, the center location they are voting should be similar. FIG. 5(d) gives an example. $\{(f_i, g_i)(i=1, 2, 3)\}$ cast votes on the same location as they have the same estimated new object center location $(x_o, y_o)$, while $(f_5, g_5)$ votes for a totally different location.

The cumulative votes of matched features (f, g) generate a voting map, in which each location represents a possible new object center associated with a certain translation t. When votes are cast using equation 4, the accumulated score at each location is exactly the similarity measure S(Q,D|T) in equation 2. To choose the best translation $t^*$, at least some embodiments may select the statistical mode in the voting map. Note that other methods may be used to determine the best translation in some embodiments.

Note that, before voting, the query has been transformed to $n_R$ rotation angles and $n_s$ scales. Therefore there are $n_R*n_s$ voting maps in total. In at least some embodiments, a best transformation $T^*$ may be achieved by finding the location with the highest score in all voting maps. Meanwhile, the best score serves as the similarity between the query and the database image, which is subsequently used for ranking. This scheme allows embodiments to simultaneously achieve object retrieval and localization without sub-window search or post-processing.

In at least some embodiments, when the objects are mostly upright, rotation may be switched off, and thus only scale change and translation may be considered. When generating the voting map, a map with much smaller size may be maintained compared to the images, by quantizing the map to $n_x \times n_y$ grids. In at least some embodiments, to avoid quantization errors and allow object deformation, instead of voting on one grid, voting may be performed on a 5×5 window around the estimated center grid for each matched pair. The voting score of each grid is the initial Score(k) in equation 4 multiplied by a Gaussian weight, for example $\exp(-d/\sigma^2)$ where d is the distance of the grid to the center. This has the effect of spatially smoothing the votes and may be equivalent to generating a single vote and smoothing it with a Gaussian filter afterwards.

Figures 6A, 6B:
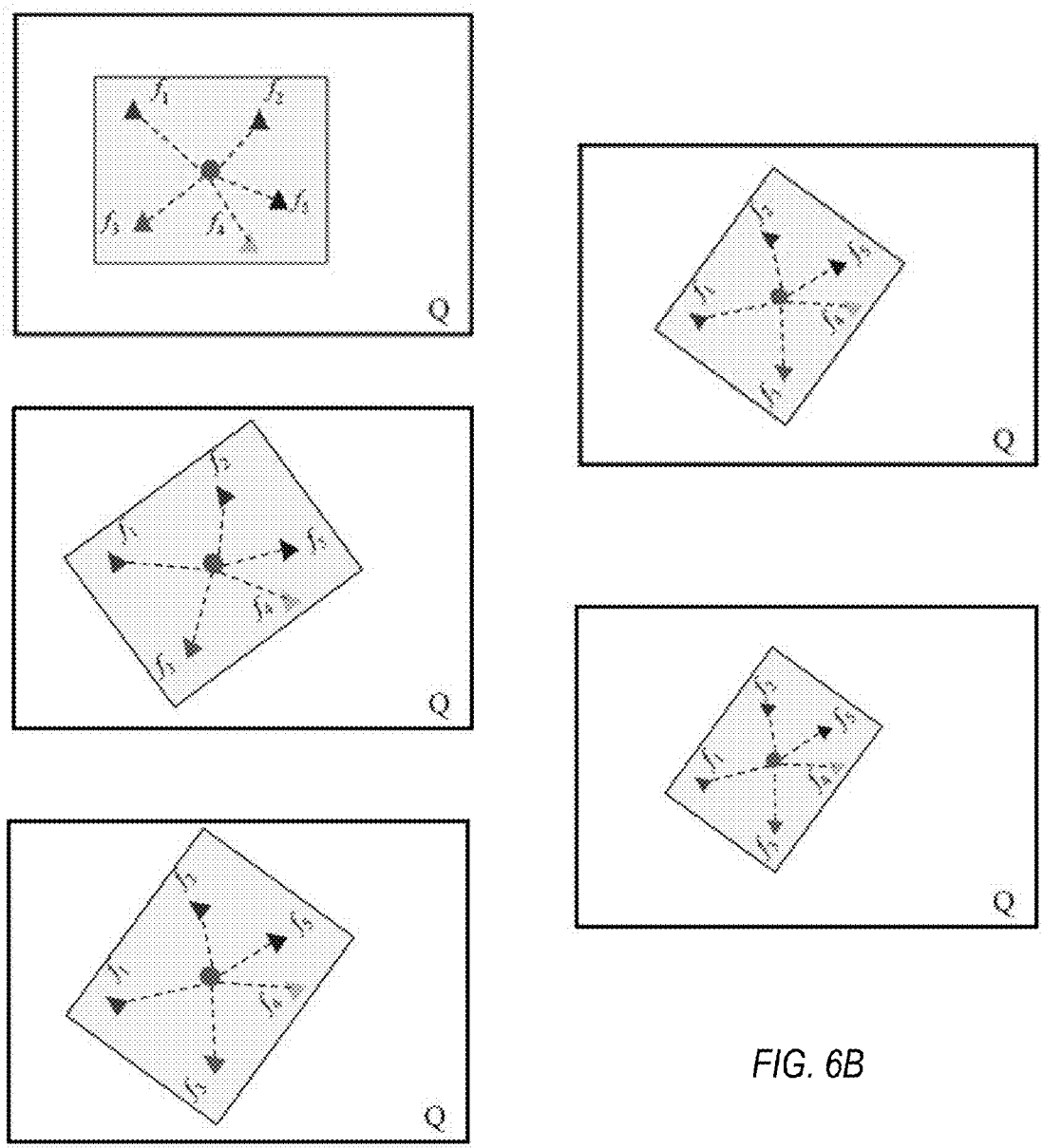
FIGS. 6A through 6F illustrate the voting-based scoring technique, according to at least some embodiments.
Figure 6C:
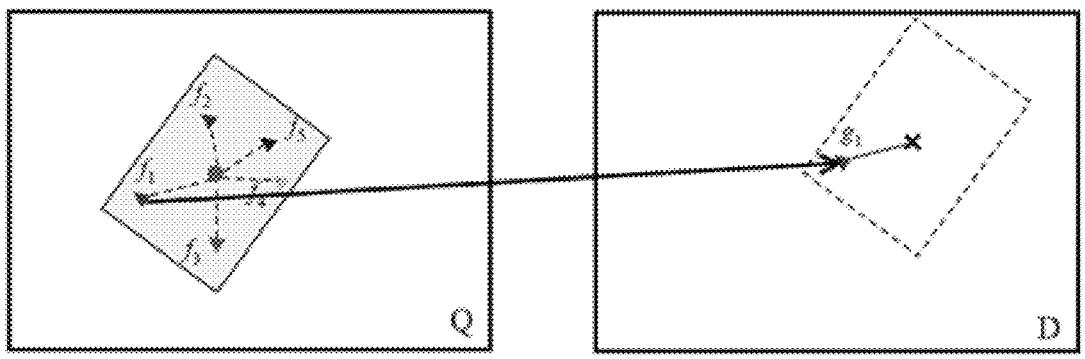
Figure 6D:
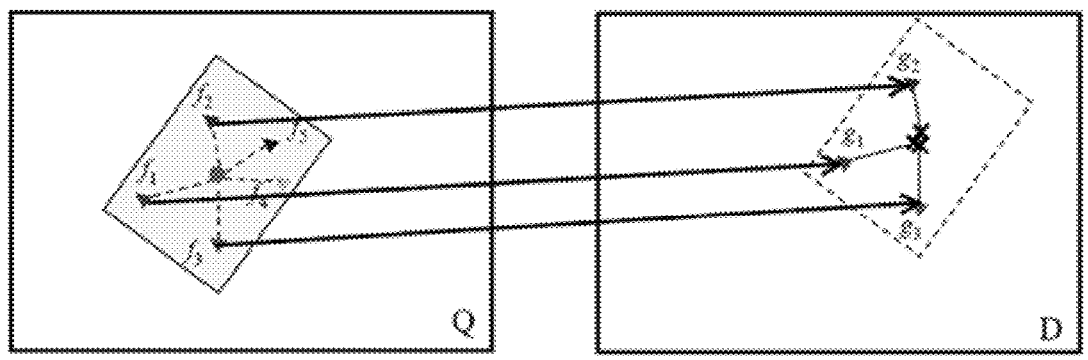
Figure 6E:
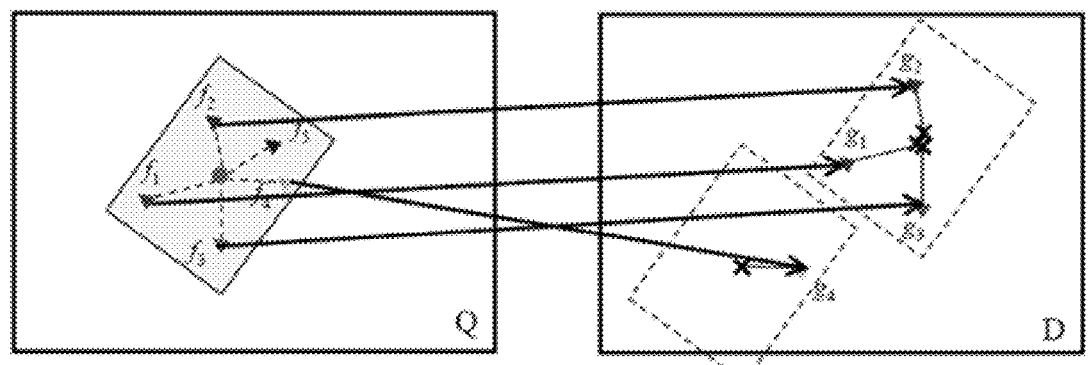
Figure 6F:
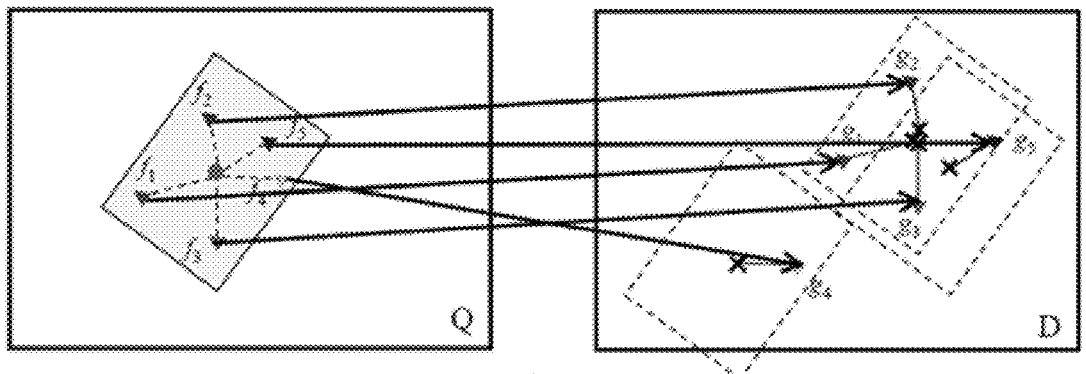

FIGS. 6A through 6F graphically illustrate the voting-based technique, according to at least some embodiments. As shown in FIGS. 6A and 6B, the voting-based technique may decompose rotation and scaling with translation. In FIG. 6A, the query object may be transformed to different rotation angles. In FIG. 6B, the query object may be transformed to different scales. FIGS. 6C through 6F graphically illustrate generating a voting map for each transformed query. FIG. 6C illustrates voting on an estimated object center with score. At FIG. 6F, after all voting maps have been generated, a location with the highest score may be chosen.

Figure 7:
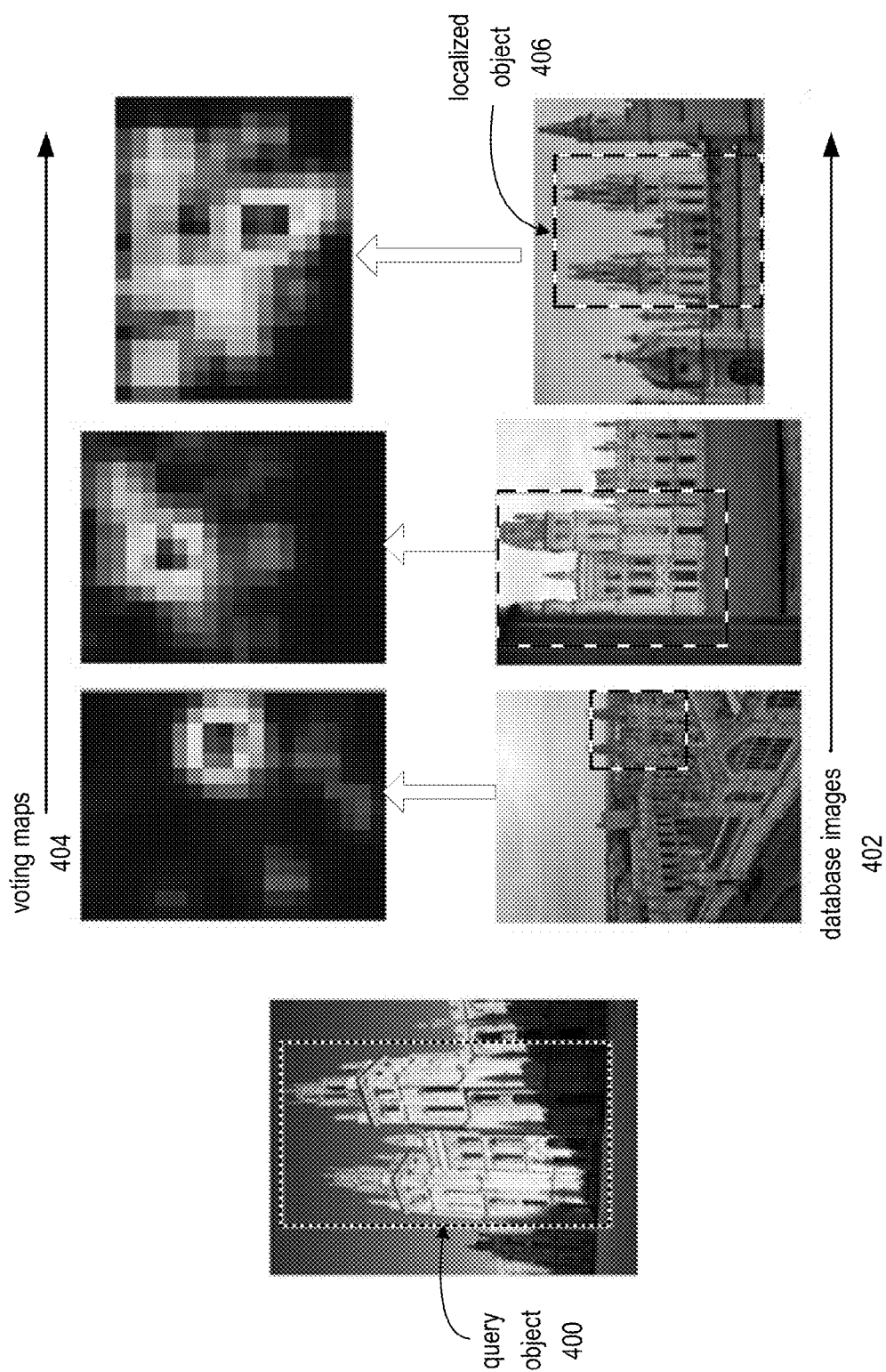
FIG. 7 shows an example of generated voting maps and corresponding localized objects, according to at least some embodiments.
Figure 8:
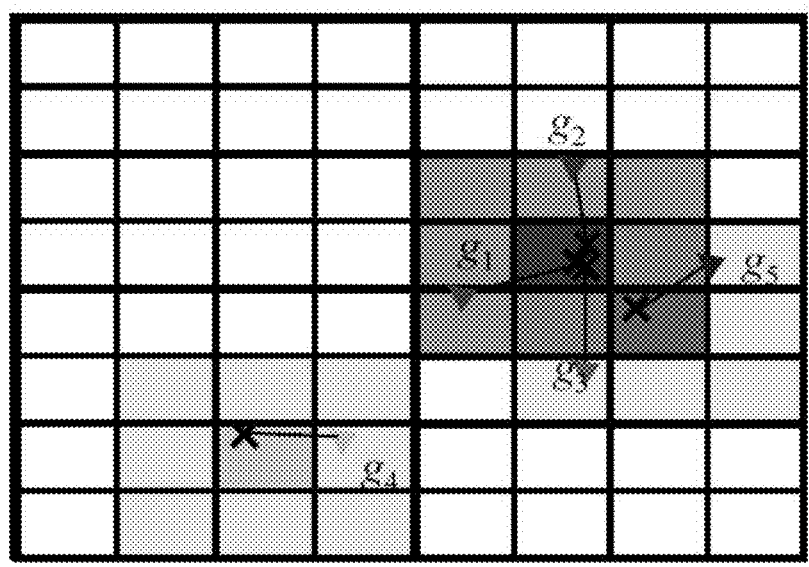
FIG. 8 graphically illustrates voting on low-dimensional grid cells, according to at least some embodiments.
Figures 9, 10:
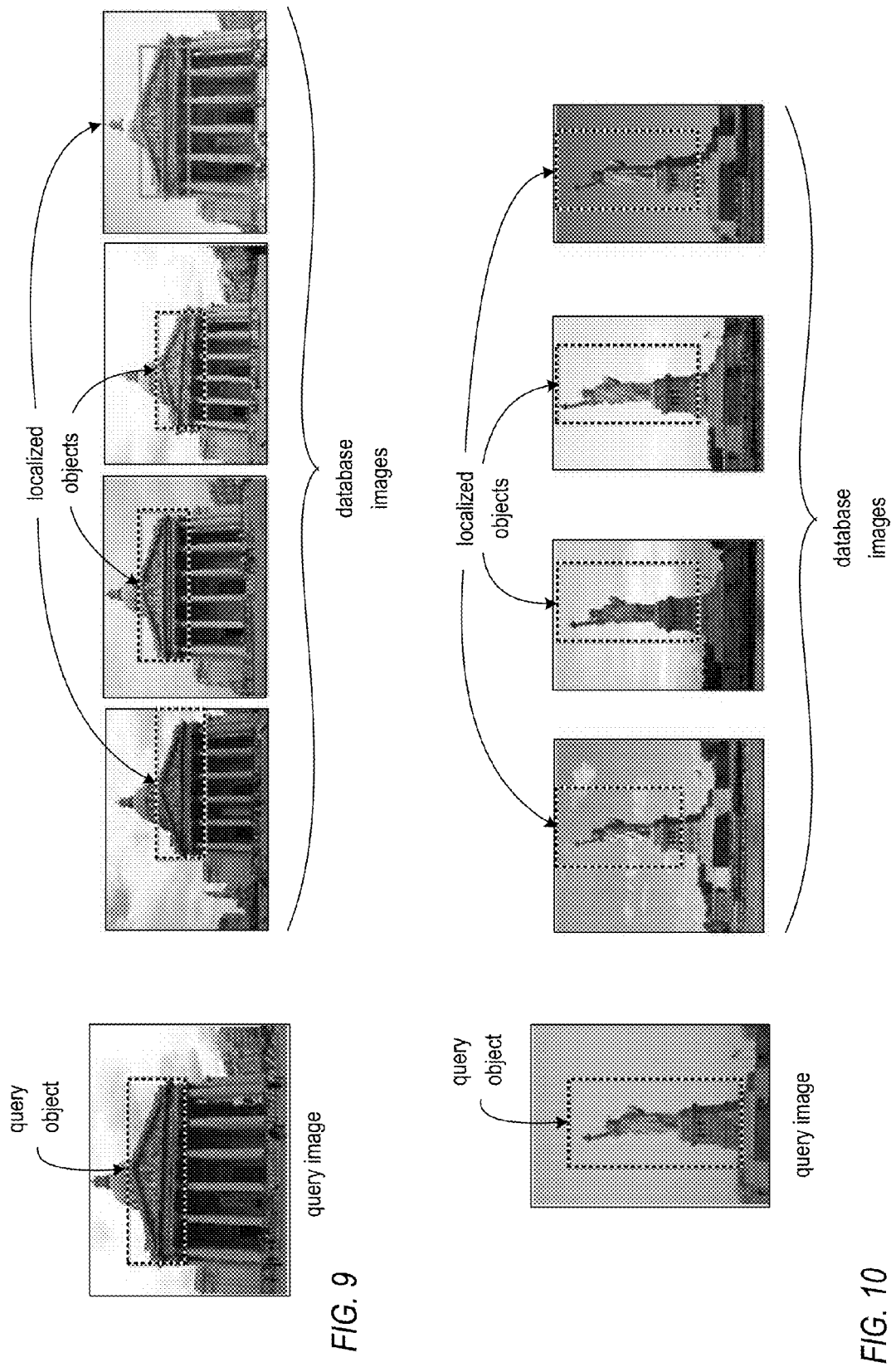
FIGS. 9 through 13 show some example results of object localization as performed by an embodiment of the object retrieval and localization technique that incorporates the spatially constrained similarity measure and voting-based localization.
Figures 11, 12:
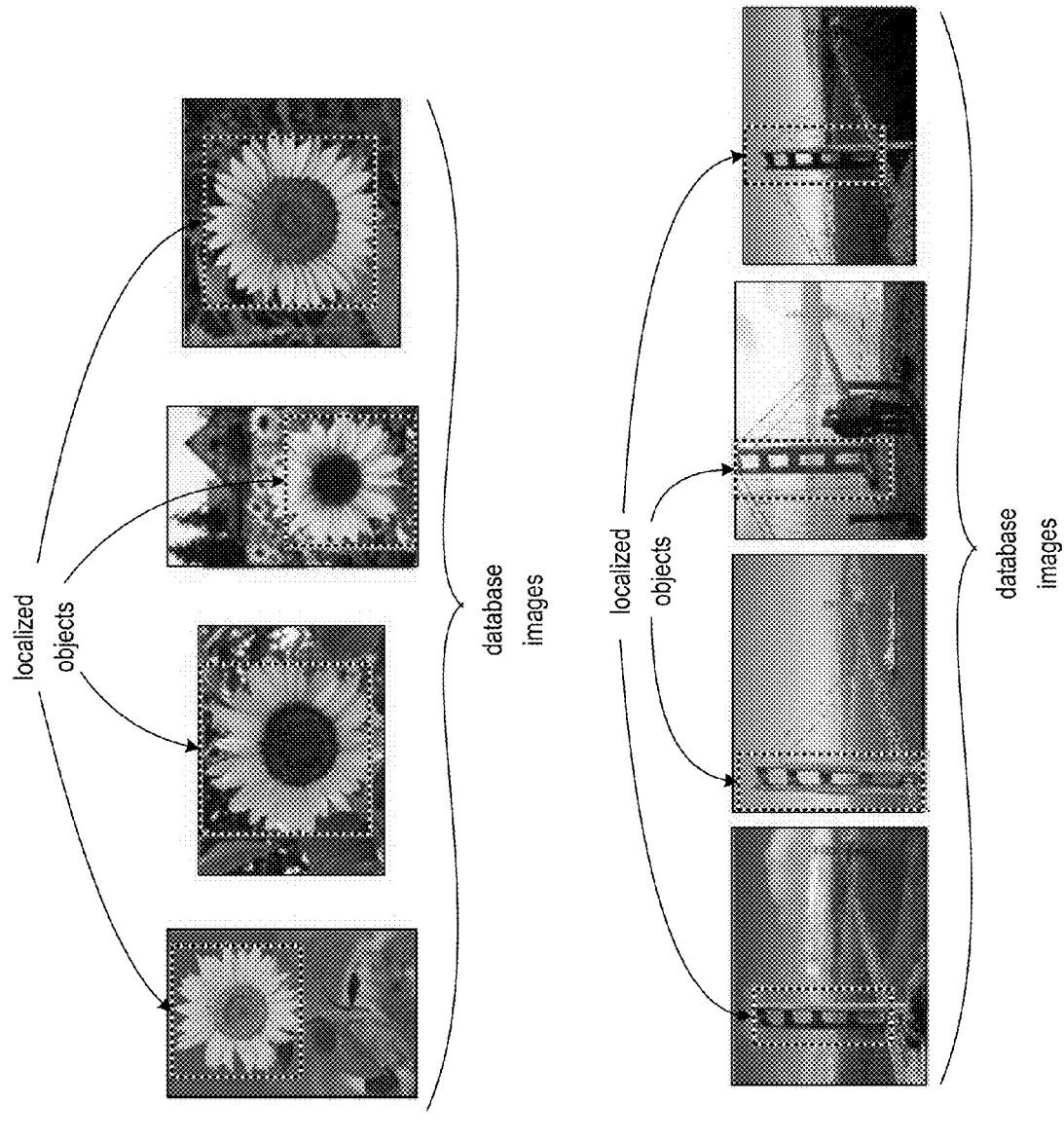
Figure 13:
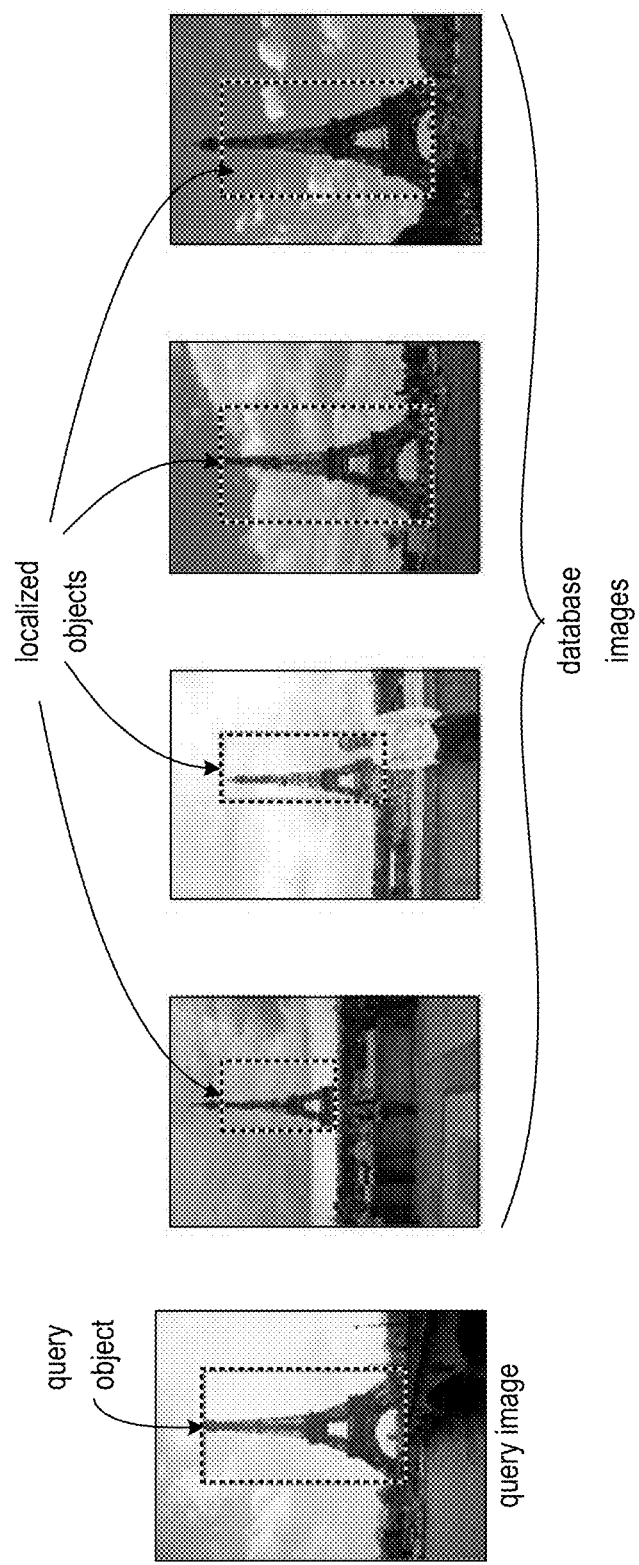

FIG. 7 shows an example of generated voting maps and corresponding localized objects, according to at least some embodiments. Given the query object 400 represented by the dotted rectangle in the left image (e.g., a query image), the voting maps 404 generated for the three database images 402 are shown in the top row. Each voting map 404 has a single peak as most feature pairs in the same object cast their votes on the same location. The object may be robustly localized even if there is dramatic scale and view point change, or severe occlusion. Localized objects are shown by the dashed rectangles in the database images 402, e.g. localized object 406 in the rightmost image. FIG. 8 graphically illustrates voting on low-dimensional grid cells, according to at least some embodiments.

FIGS. 9 through 13 show some example results of object localization as performed by an embodiment of the object retrieval and localization technique that incorporates the spatially constrained similarity measure and voting-based localization as described above. In each of FIGS. 9 through 13, the image on the left is the query image and shows the query object as a dotted triangle, while the other images are the top four ranked images from the database, each showing its localized results.

Figure 14:
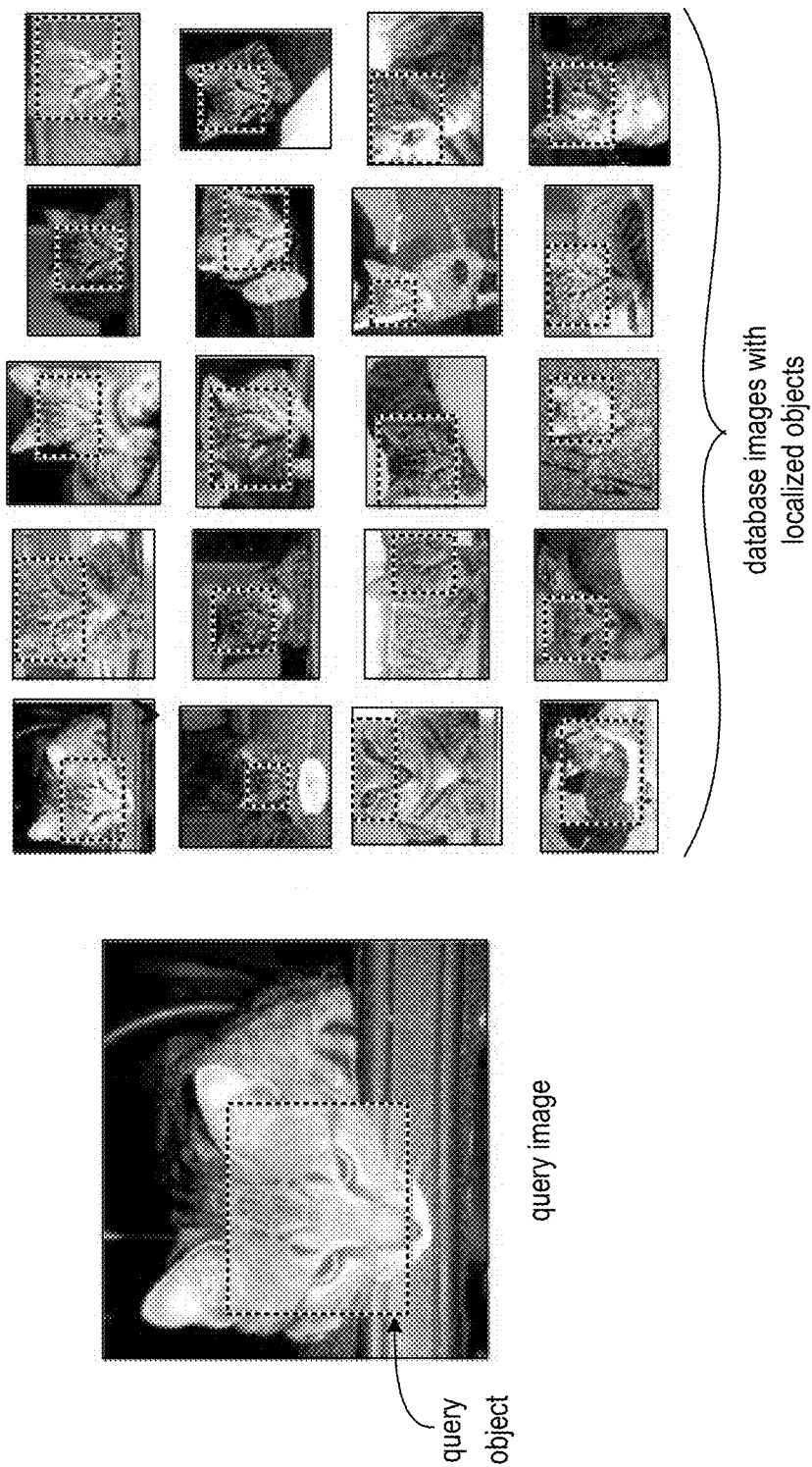
FIG. 14 shows example results of object localization for a non-rigid object as performed by an embodiment of the object retrieval and localization technique that incorporates the spatially constrained similarity measure and voting-based localization.

FIG. 14 shows example results of object localization for a non-rigid object as performed by an embodiment of the object retrieval and localization technique that incorporates the spatially constrained similarity measure and voting-based localization. The image on the left is the query image and shows the query object as a dotted triangle, while the other images are twenty images from the database, each showing its localized results indicated by a dotted rectangle. The top left database image, indicated by the checkmark in the lower right corner, is the top-ranked image from the database.

Similarity Evaluation Using Inverted Files

In at least some embodiments, to calculate the spatially-constrained similarity measure and determine the best transformation, the locations (e.g., X- and Y-coordinates) of the features may be stored in inverted files. In at least some embodiments, when calculating the voting map, a general retrieval framework may be followed; i.e., for each word k in the query, retrieve the image IDs and locations of k in these images through the inverted files. Object center locations and scores may then be determined according to equation 4, and votes may be cast on corresponding voting maps.

There may be different techniques for applying rotation and scale change in the search process. One technique that may be used in some embodiments is to allocate $n_R \cdot n_s$ voting maps at each search round. When traversing the inverted files, voting is performed on all those maps. Therefore the inverted files may only be traversed once. Another technique that may be used in some embodiments is to sequentially generate voting maps for each quantized rotation and scale value. Therefore, only one voting map is maintained for each database image. However, retrieving may be done $n_R \cdot n_s$ times. In at least some embodiments, as a trade-off between search time and memory, a technique may be used in which search is performed for each quantized rotation step, and $n_s$ voting maps are generated with different scales in each search process. In that case, $n_s$ voting maps are maintained for each image, and search is performed $n_R$ times.

k-NN Re-Ranking

Embodiments of a k-nearest neighbors (k-NN) re-ranking method are described that may, for example, be employed to refine the results of the object retrieval and localization technique described above. Since the object in each retrieved database image has been localized, the top-k retrieved objects may be further used to refine the retrieval results. Embodiments of the k-NN re-ranking technique may leverage the query's k-nearest neighbors. In the k-NN re-ranking method, given the top-k retrieved images and their localized objects, each k-NN object may be used as a query to perform a search. A database image will have different ranks when using those k-nearest neighbors as queries. Accordingly, a new score of each database image may be collaboratively determined by those ranks, and re-ranking may be performed using the new scores. Unlike previous query expansion methods, this rank-based score measure discards similarities between images. Therefore, the method can successfully retrieve objects with large variations, while avoiding degradation when there are wrong or irrelevant objects in the k-nearest neighbors.

While embodiments of the k-NN re-ranking method are generally described herein as being employed in a retrieval system to refine results of the object retrieval and localization technique described herein, the k-NN re-ranking method may be used with or applied to results of any of various other techniques that perform searches of collections of items (files, images, objects, words, phrases, etc) to improve the results of particular searches, or may be used in other applications.

Figure 15:
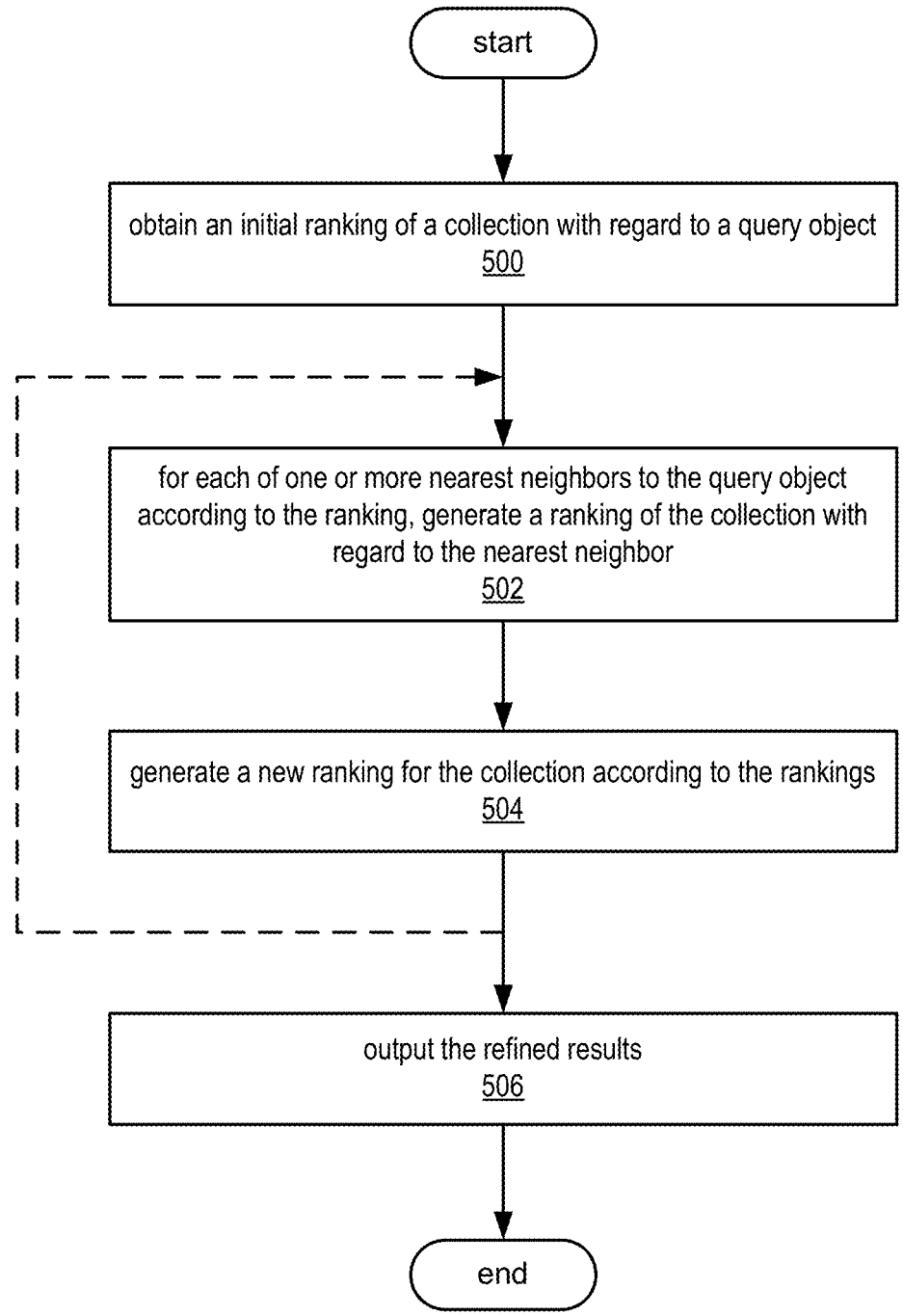
FIG. 15 is a high-level flowchart for a k-NN re-ranking method, according to at least some embodiments.

FIG. 15 is a high-level flowchart for a k-NN re-ranking method, according to at least some embodiments. As indicated at 500, an initial ranking of a collection (e.g., an image database) with regard to a query object may be obtained. For example, the initial ranking may be generated according to an embodiment of the object retrieval and localization technique described above. As indicated at 502, for each of one or more nearest neighbors to the query object according to the ranking, a ranking of the collection with regard to the nearest neighbor may be generated. In at least some embodiments, a localized object in a respective nearest neighbor may be used to search the collection for similar objects, with the ranking determined according to the resulting similarity scores. In at least some embodiments, features outside of the localized object may disregarded during the search for the nearest neighbor. As indicated at 504, a new ranking for the collection may then be generated according to the rankings. For example, the new ranking may be determined as a weighted sum of the rankings with respect to the query object and the rankings with respect to the one or more nearest neighbors, where the weighting favors images that are closer to the query object and/or to the nearest neighbors. As indicated by the dashed line returning to element 502, the re-ranking technique may be iteratively applied according to the new ranking. As indicated at 506, after the one or more iterations are complete, refined results (a refined re-ranking of the collection) may be output.

The elements of the k-NN re-ranking method illustrated in FIG. 15 are described in more detail in the following discussion.

Figure 16:
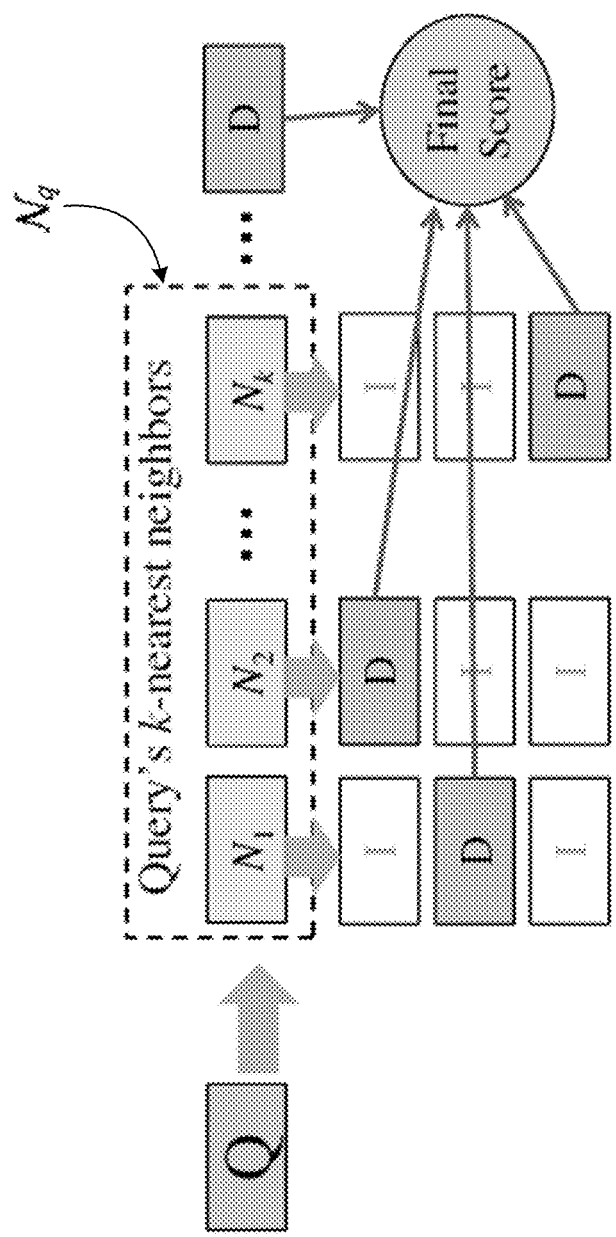
FIG. 16 illustrates the k-NN re-ranking technique, according to at least some embodiments.

FIG. 16 graphically illustrates the k-NN re-ranking technique, according to at least some embodiments. As illustrated in FIG. 16, the final rank of a database image may be determined by its rank in the query's retrieval results as well as its ranks in the retrieval results of query's k-nearest neighbors. Given a query image Q, the rank of a database image according to search S* may be denoted by R(Q, D). Let $N_i$ be the query's i-th retrieved image. Note that $R(Q, N_i)=i$. Accordingly, $N_q=\{N_i\}_{(i=1,\ldots,k)}$ are the query's k-nearest neighbors, as shown in FIG. 16. $N_q$ may be referred to as the k-NN set of the query image.

Figure 17:
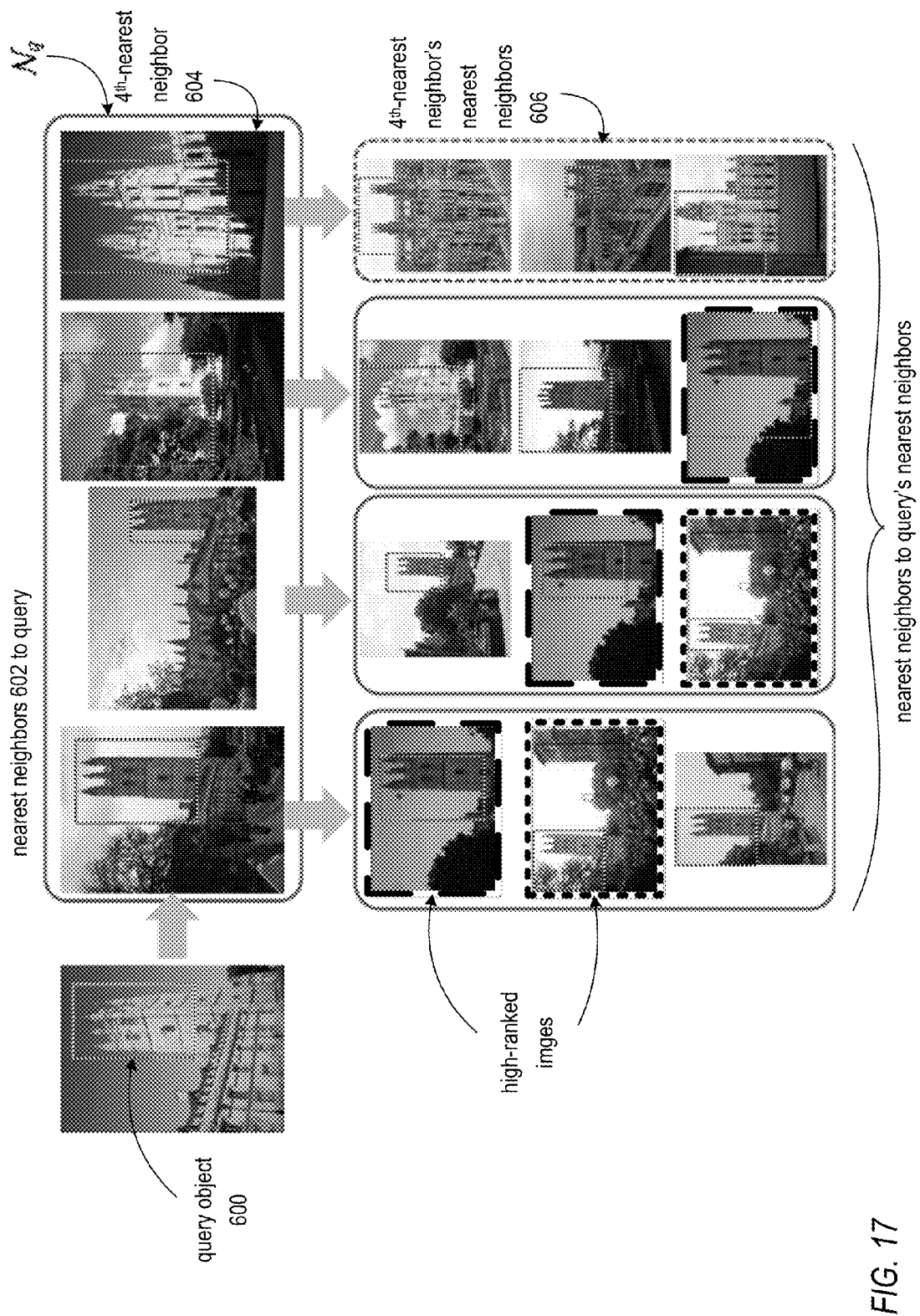
FIG. 17 shows an example of k-NN re-ranking, according to at least some embodiments.

In many or most cases, a majority of these k-nearest neighbors may contain the same object as in the query image, while there may also be some retrieved irrelevant images. See FIG. 17, for example. FIG. 17 gives an example of k-NN re-ranking, according to at least some embodiments. In FIG. 17, the $4^{th}$ nearest neighbor 604 to the query 600 in $N_q$ is an irrelevant image. However, the $4^{th}$ nearest neighbor 604's three nearest neighbors 606 shown in the dashed rectangle below the $4^{th}$ nearest neighbor 604 will not receive high scores from other nearest neighbors 602 in $N_q$. The images enclosed by the heavy dashed and dotted boxes under the nearest neighbors 602 are close to a majority of the query's nearest neighbors 602 in $N_q$ and accordingly receive relatively high ranks As the features are variant to view point change, occlusion or object deformation, some images with the same object are not visually close to the query, and hence tend to be ranked relatively low. However, they may be visually similar to certain images in $N_q$. Therefore, if such information can be utilized while avoiding the corruption caused by the outliers in $N_q$, the retrieval performance may be significantly improved.

In at least some embodiments, each localized object in $N_q$ may be used as a query and a search performed. The rank of a database image D when using $N_i$ as the query, may be denoted by $R(N_i, D)$ as shown in FIG. 16. According to the rank, a score:

$$\frac{1}{R(N_i, D)}$$

may be assigned to each database image. The final scores of the database images are then collaboratively determined as:

$$\bar{S}(Q, D) = \frac{w_0}{R(Q, D)} + \sum_{i=1}^{k} \frac{w_i}{R(N_i, D)} \quad (5)$$

where $w_i$ is the weight, which is determined by the rank of $N_i$ in the initial search. In at least some embodiments, $w_0=1$ and $$w_i=1/(R(Q,N_i)+1)=1/(i+1).$$

In at least some embodiments, to make the equation compact, the query may be regarded as the 0-th nearest neighbor, and equation 5 may be accordingly reformulated as:

$$\bar{S}(Q, D) = \sum_{i=0}^{k} \frac{w_i}{R(N_i, D)} = \sum_{i=0}^{k} \frac{1}{(i+1)R(N_i, D)} \quad (6)$$

In at least some embodiments, the rank of the query may be considered in each of its nearest neighbor's retrieval results, i.e., $R(N_i, Q)$. Here, the rank is a unidirectional measure. Query Q and its nearest neighbor $N_i$ are close only if $R(Q, N_i)$ and $R(N_i, Q)$ are both high. Hence the weight $w_i$ may be modified to be $$w_i=1/(R(Q,N_i)+R(N_i,Q)+1))=1/(i+R(N_i,Q)+1),$$

and the scores of database images may be determined by:

$$\bar{S}(Q, D) = \sum_{i=0}^{k} \frac{1}{(i+R(N_i, Q)+1)R(N_i, D)} \quad (7)$$

Images may then be re-ranked based on $\bar{S}(Q, D)$.

In at least some embodiments, after the new top-k retrieved images are obtained, the new top-k retrieved images can be used as the query's new k-nearest neighbors and re-ranking can be iteratively performed. In most cases, one iteration significantly improves the results, but two or more iterations may be performed to further refine the results.

Embodiments of the k-NN re-ranking method described herein may leverage the localized objects provided by the spatially-constrained similarity measure voting-based scoring as described herein, and irrelevant features outside the objects can be ignored. After localization, each retrieved image in $N_q$ has a specified object, and other irrelevant background information may be excluded.

As a rank-based technique, the k-NN re-ranking method described herein may be robust to false retrieval results in $N_q$. Unlike query expansion, the score is inversely related to the ranking, and the similarities between images may be intentionally discarded. A database image will not be re-ranked very highly unless it is close to the query and a majority of those k-NN images.

Considering FIG. 17 as an example, the irrelevant image in $N_q$ assigns scores to its top-retrieved results. However, the weight corresponding to this outlier is relatively small as the rank itself in the query's retrieval list is not high. Furthermore, the images in the dashed box will not receive scores from other images in $N_q$ and accordingly their scores for re-ranking are still low. On the contrary, a relevant image such as the ones with dashed bounding box or dotted bounding box is close to several images in $N_q$ and will generally have a high score.

Experimental results show that the k-NN re-ranking method described herein is not sensitive to the selection of nearest neighbor number k. Even if k is large and there are many outliers in $N_q$, the retrieval accuracy is still very high. Since the k-NN re-ranking method is robust to outliers, no spatial verification is needed. Also, re-ranking can be efficiently performed on the entire database. Embodiments of the k-NN re-ranking method may also be independent of a similarity metric.

Example Implementations

Embodiments of a retrieval method, system or module may be implemented according to the spatially-constrained similarity measure, voting-based technique that evaluates the similarity measure to simultaneously retrieve and localize objects, and re-ranking method with the k-nearest neighbors of the query (k-NN re-ranking) as described herein. Given a query image, the retrieval method may rank database images according to their visual similarity to the query image. Given a query object (represented by a sub-query image), the retrieval technique may rank database images according to their likelihood of containing the query object, and localize objects in the database images. Embodiments may employ a spatially-constrained similarity measure to successfully handle general object transformation, which significantly improves the retrieval performance compared with the basic bag-of-words model. Embodiments may employ a voting-based technique that evaluates the similarity measure and that simultaneously retrieves and localizes the object in the database images. Embodiments may also employ a re-ranking method with the k-nearest neighbors of the query, which may achieve better performance in common evaluation benchmarks than do conventional techniques.

While the spatially-constrained similarity measure, the voting-based technique that evaluates the similarity measure to retrieve and localize objects, and k-NN re-ranking method are described herein as being used together in a retrieval method, note that one or more of these techniques may be adapted for use in other applications or for other purposes.

Figure 18:
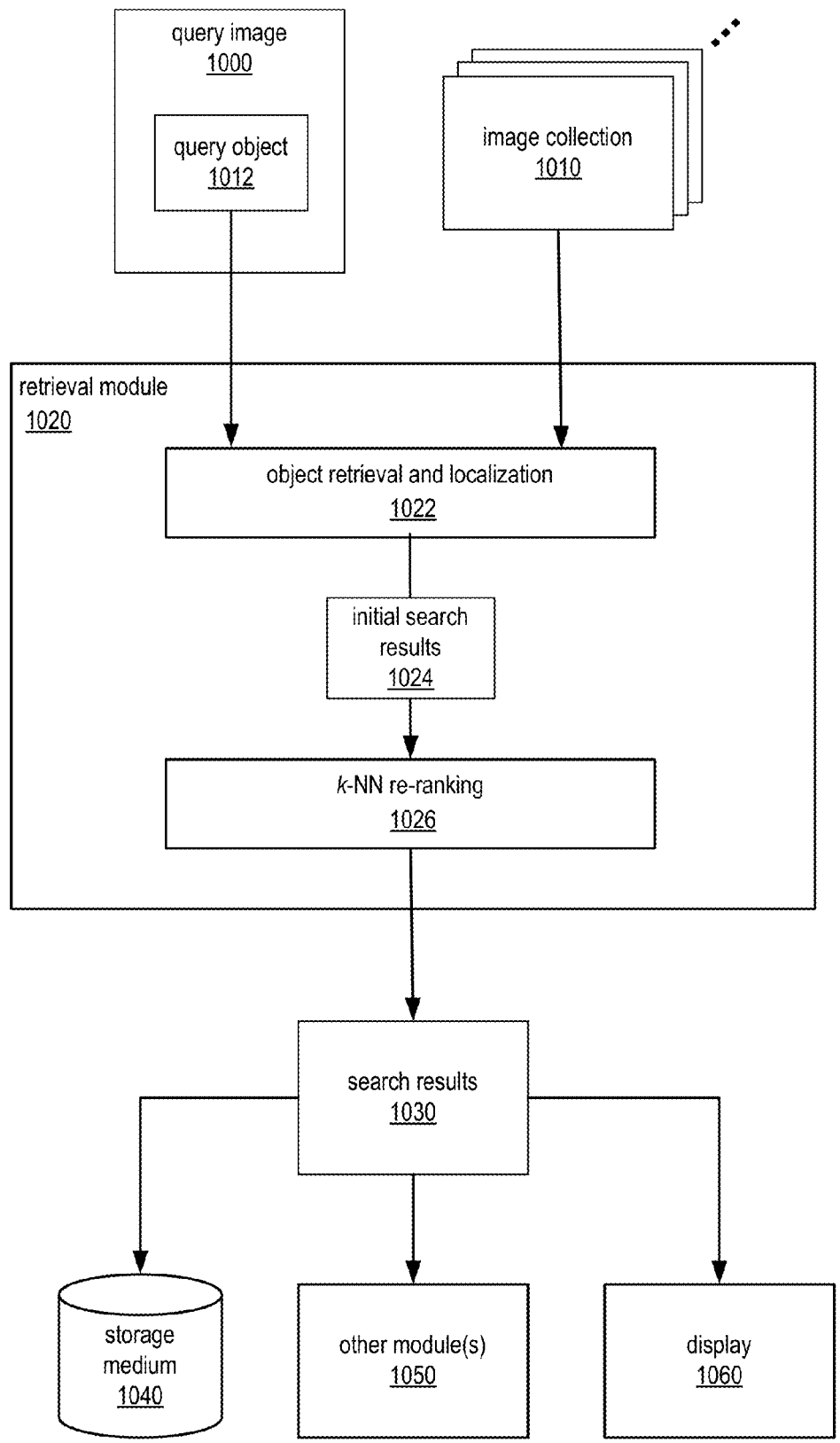
FIG. 18 illustrates a module that may implement embodiments of the object retrieval and localization technique and the k-NN re-ranking method as described herein.
Figure 19:
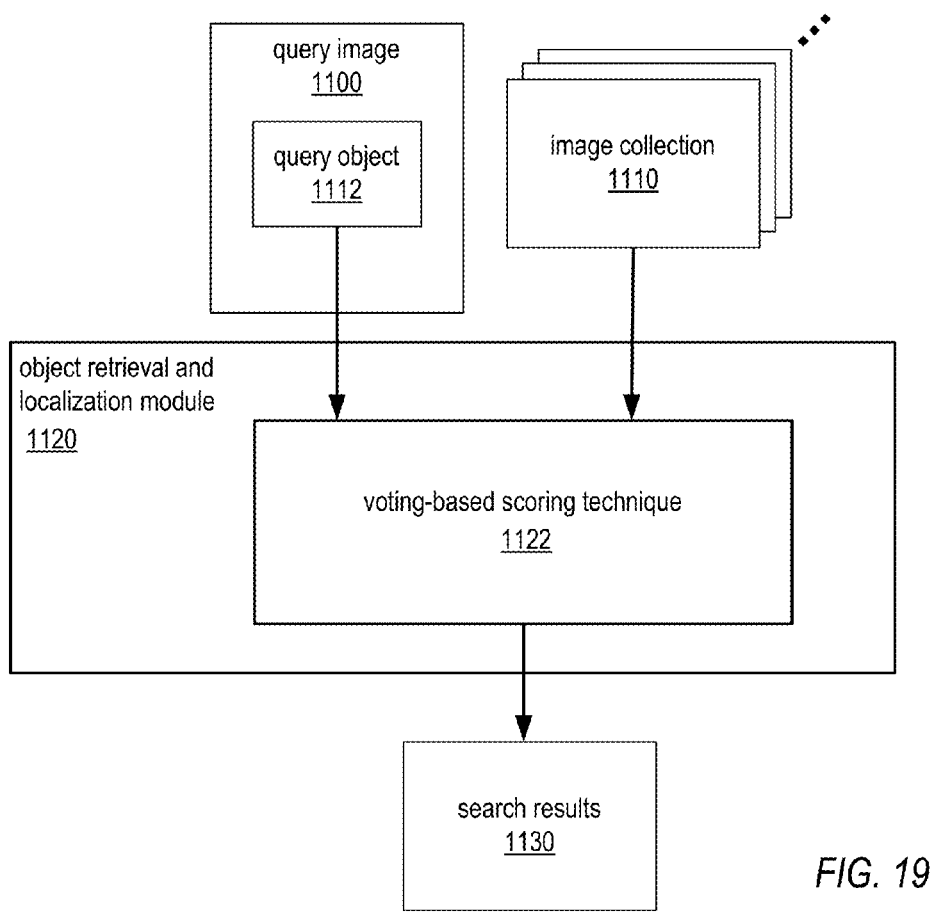
FIG. 19 shows an object retrieval and localization module that implements an embodiment of the object retrieval and localization technique as described herein.
Figure 20:
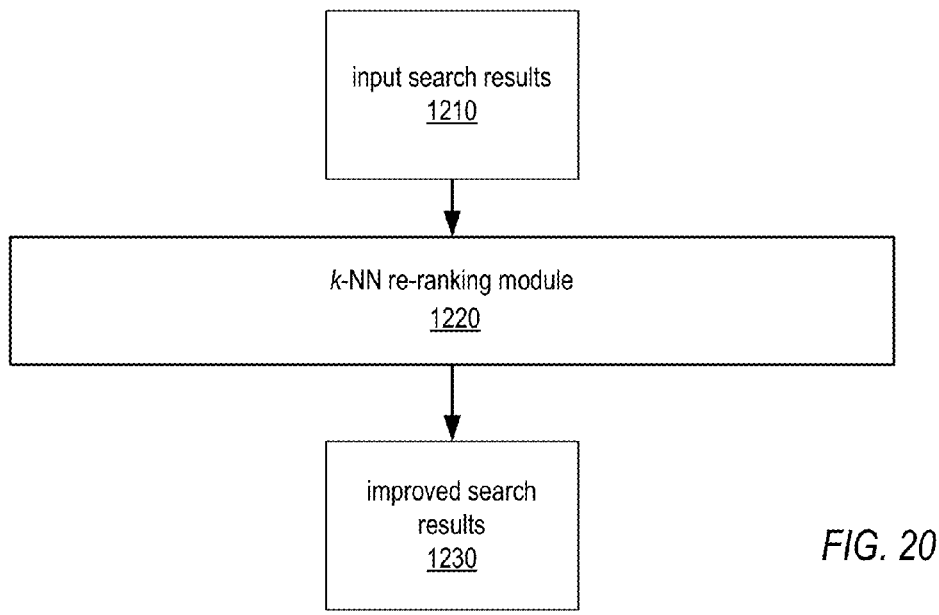
FIG. 20 shows a k-NN re-ranking module that implements an embodiment of the k-NN re-ranking method as described herein.
Figure 21:
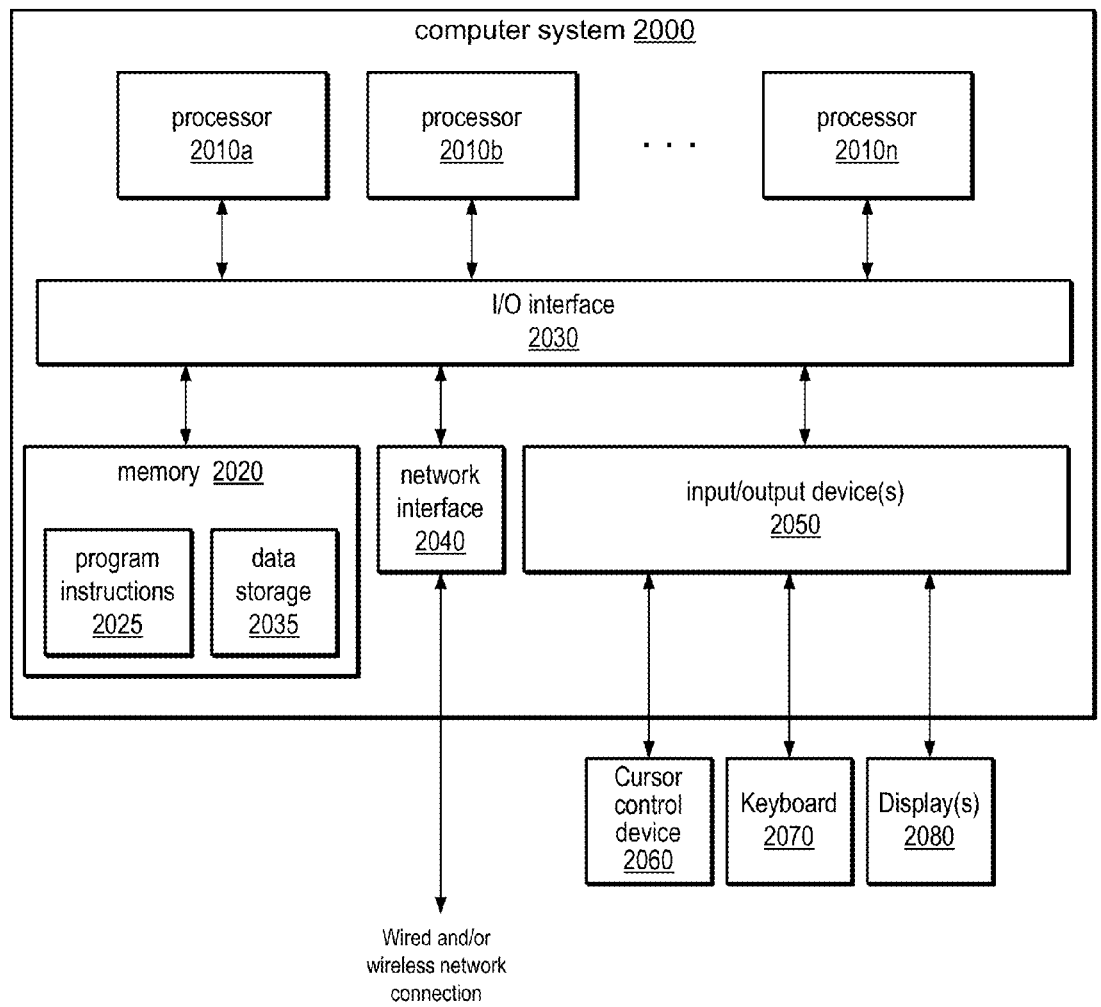
FIG. 21 illustrates an example computer system that may be used in embodiments.

Embodiments of the techniques as described herein, for example the spatially-constrained similarity measure, the voting-based technique, and the k-NN re-ranking method, or a retrieval method that incorporates two or more of these techniques, may be used in various applications, for example applications in which objects (e.g. images) need to be retrieved based on a query object, and/or in which similar images to a query image need to be retrieved. Examples of applications in which embodiments may be used include, but are not limited to, Adobe® Photoshop®, Adobe® Photoshop® Lightroom®, and Adobe® Photoshop® Elements®. "Adobe", "Photoshop", "Lightroom", and "Elements" are either registered trademarks or trademarks of Adobe Systems Incorporated in the United States and/or other countries. An example module that may implement the techniques described herein is illustrated in FIG. 18. In addition, the techniques as described herein may be separately implemented as modules, for example as modules in an application or as modules in a library or toolbox that may be called or incorporated by various other applications. FIGS. 19 and 20 illustrate the object retrieval and localization technique and k-NN re-ranking method implemented independently in separate modules. An example system on which one or more of the modules may be implemented is illustrated in FIG. 21.

Some embodiments may include a means for object retrieval and localization using the techniques as described herein. For example, a module may be provided that may implement an embodiment of the object retrieval and localization technique and the k-NN re-ranking method, for example as illustrated in FIGS. 2 through 17. The module may, for example, employ a voting-based technique that evaluates a spatially-constrained similarity measure and that simultaneously retrieves and localizes the object in the database images, and may also employ a re-ranking method with the k-nearest neighbors of the query, as described herein. The module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform the techniques as described herein, for example as illustrated in FIGS. 2 through 17. Other embodiments of the module may be at least partially implemented by hardware circuitry and/or firmware stored, for example, in a non-volatile memory. Also note that the object retrieval and localization technique and k-NN re-ranking method as described herein may be implemented independently in separate modules.

FIG. 18 illustrates a retrieval module that may implement embodiments of the object retrieval and localization technique and the k-NN re-ranking method as described herein. Retrieval module 1020 may, but does not necessarily receive a query object 1012 from a query image 1000 and an indication of an image collection 1010 (e.g., an image database) that is to be searched. The module 1020 may display a user interface via which a user may, for example, specify inputs and/or parameters and via which progress and results may be displayed to the user. The module 1020 may perform object retrieval and localization 1022 as described herein to generate initial search results 1024 that may indicate ranking of images in collection 1010 in regard to similarity or relevance to the query object 1012 and/or query image 1000. Object retrieval and localization 1022 may employ a voting-based scoring technique that evaluates a spatially-constrained similarity measure as described herein and that simultaneously retrieves and localizes the object 1012 in one or more images in collection 1010. The module 1020 may employ a re-ranking method with the k-nearest neighbors of the query (k-NN re-ranking 1026) as described herein to improve initial search results 1024. Other actions may be performed by module 1020 as illustrated in and described for FIGS. 2 through 17. The module 1020 may generate as output search results 1030 that may indicate ranking of images in collection 1010 in regard to the images' similarity or relevance to the query object 1012 and/or query image 1000. Search results 1030 may, for example, be stored to a storage medium 1040, such as system memory, a disk drive, DVD, CD, etc., displayed on a display 1060, and/or passed to one or more other modules 1050.

FIGS. 19 and 20 illustrate the object retrieval and localization technique and k-NN re-ranking technique implemented independently in separate modules. FIG. 19 shows an object retrieval and localization module 1120 that implements an embodiment of the object retrieval and localization technique as described herein, for example in FIG. 4. The module 1120 may employ a voting-based scoring technique 1124 that evaluates a spatially-constrained similarity measure and that simultaneously retrieves and localizes the object 1112 in images in the image collection 1110. The module 1120 may generate as output search results 1130 that may indicate ranking of images in collection 1110 in regard to similarity or relevance to the query object 1112 and/or query image 1100.

FIG. 20 shows a k-NN re-ranking module 1220 that implements an embodiment of the k-NN re-ranking method as described herein, for example as illustrated in FIG. 15. Module 1220 may receive as input at least search results 1210 that may, for example, indicate ranking of images in a collection such as an image database in regard to similarity or relevance to a query object and/or query image. Module 1220 may employ a re-ranking method with the k-nearest neighbors of the query as described herein to generate improved search results 1230 that may, for example, indicate a re-ranking of some or all images in a collection such as an image database in regard to similarity or relevance to the query object and/or query image.

FIG. 21 illustrates an example computer system on which embodiments of module 1020, 1120, and/or 1220 may be implemented.

Example System

Embodiments of the object retrieval and localization technique and/or the k-NN re-ranking method as described herein may be executed on one or more computer systems, which may interact with various other devices. One such computer system is illustrated by FIG. 21. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processor(s) 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the object retrieval and localization technique and/or the k-NN re-ranking method disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the object retrieval and localization technique and/or the k-NN re-ranking method as described herein are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor(s) 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor(s) 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor(s) 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 21, memory 2020 may include program instructions 2025, configured to implement embodiments of the object retrieval and localization technique and/or the k-NN re-ranking method as described herein, and data storage 2035, comprising various data accessible by program instructions 2025. In one embodiment, program instructions 2025 may include software elements of embodiments of the object retrieval and localization technique and/or the k-NN re-ranking method as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the object retrieval and localization technique and/or the k-NN re-ranking method as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
performing, by one or more computing devices:
obtaining a query object for a query image, wherein the query object is represented by a bounding box within the query image and indications of a plurality of features of the query image located within the bounding box;
generating a plurality of geometric transforms of the query object, at least one transform constraining location closeness of two features to be less than a tolerance parameter;
calculating a similarity score for each of the plurality of transforms with respect to a target image according to a spatially-constrained similarity measure that accounts for rotation, scale, and translation and includes a normalization term to penalize repetitions in the query image; and
selecting the transform with a highest similarity score, wherein the transform with the highest similarity score indicates a localized object in the target image that best matches the query object.

2. The method as recited in claim 1, wherein said generating a plurality of geometric transforms of the query object comprises rotating and scaling the query object according to each combination of a plurality of rotation angles and a plurality of scales.

3. The method as recited in claim 2, wherein said rotating and scaling the query object according to each combination of a plurality of rotation angles and a plurality of scales comprises, for each combination, applying the rotation angle and the scaling factor to each of the plurality of features relative to a center of the bounding box.

4. The method as recited in claim 1, wherein said calculating a similarity score for each of the plurality of transforms with respect to a target image according to a spatially-constrained similarity measure comprises:
matching two or more features in the target image to the plurality of features of the query object to generate two or more feature pairs;
for each of the plurality of transforms:
generating a voting map according to the feature pairs, wherein the voting map accumulates a voting score, calculated for each feature pair, for a translated location of a center of an object in the target image that matches the query object; and
selecting the translated location for the center of the object with respect to the current transform according to the voting map; and
wherein the accumulated voting score in each voting map indicates the similarity score for the respective transform.

5. The method as recited in claim 4, further comprising, for each feature pair, calculating the voting score according to a tf-idf (term frequency-inverse document frequency) weighting technique.

6. The method as recited in claim 1, further comprising:
performing said calculating and said selecting for each of a plurality of images in an image collection, wherein the highest similarity score for each image determines a similarity value for the respective image with respect to the query image; and
ranking the plurality of images according to the similarity values of the respective images with respect to the query image.

7. The method as recited in claim 6, further comprising:
generating a ranking of the plurality of images with respect to each of one or more nearest neighbor images as indicated by the ranking with respect to the query image; and
re-ranking the plurality of images with respect to the query image according to the rankings with respect to the one or more nearest neighbor images.

8. A system, comprising:
one or more processors; and
a memory comprising program instructions, wherein the program instructions are executable by at least one of the one or more processors to:
obtain a query object for a query image, wherein the query object is represented by a bounding box within the query image and indications of a plurality of features of the query image located within the bounding box;
generate a plurality of geometric transforms of the query object, at least one transform constraining location closeness of two features to be less than a tolerance parameter;
calculate a similarity score for each of the plurality of transforms with respect to a target image according to a spatially-constrained similarity measure that accounts for rotation, scale, and translation and includes a normalization term to penalize repetitions in the query image; and
select the transform with a highest similarity score, wherein the transform with the highest similarity score indicates a localized object in the target image that best matches the query object.

9. The system as recited in claim 8, wherein, to generate a plurality of geometric transforms of the query object, the program instructions are executable by at least one of the one or more processors to rotate and scale the query object according to each combination of a plurality of rotation angles and a plurality of scales.

10. The system as recited in claim 9, wherein, to rotate and scale the query object according to each combination of a plurality of rotation angles and a plurality of scales, the program instructions are executable by at least one of the one or more processors to, for each combination, apply the rotation angle and the scaling factor to each of the plurality of features relative to a center of the bounding box.

11. The system as recited in claim 8, wherein, to calculate a similarity score for each of the plurality of transforms with respect to a target image according to a spatially-constrained similarity measure, the program instructions are executable by at least one of the one or more processors to:
match two or more features in the target image to the plurality of features of the query object to generate two or more feature pairs;
for each of the plurality of transforms:
generate a voting map according to the feature pairs, wherein the voting map accumulates a voting score, calculated for each feature pair, for a translated location of a center of an object in the target image that matches the query object; and
select the translated location for the center of the object with respect to the current transform according to the voting map; and
wherein the accumulated voting score in each voting map indicates the similarity score for the respective transform.

12. The system as recited in claim 11, wherein the program instructions are further executable by at least one of the one or more processors to, for each feature pair, calculate the voting score according to a tf-idf (term frequency-inverse document frequency) weighting technique.

13. The system as recited in claim 8, wherein the program instructions are further executable by at least one of the one or more processors to:
perform said calculating and said selecting for each of a plurality of images in an image collection, wherein the highest similarity score for each image determines a similarity value for the respective image with respect to the query image; and
rank the plurality of images according to the similarity values of the respective images with respect to the query image.

14. A non-transitory computer-readable storage medium storing program instructions, wherein the program instructions are computer-executable to implement:
obtaining a query object for a query image, wherein the query object is represented by a bounding box within the query image and indications of a plurality of features of the query image located within the bounding box;
generating a plurality of geometric transforms of the query object, at least one transform constraining location closeness of two features to be less than a tolerance parameter;
calculating a similarity score for each of the plurality of transforms with respect to a target image according to a spatially-constrained similarity measure that accounts for rotation, scale, and translation and includes a normalization term to penalize repetitions in the query image; and
selecting the transform with a highest similarity score, wherein the transform with the highest similarity score indicates a localized object in the target image that best matches the query object.

15. The non-transitory computer-readable storage medium as recited in claim 14, wherein, in said generating a plurality of geometric transforms of the query object, the program instructions are computer-executable to implement rotating and scaling the query object according to each combination of a plurality of rotation angles and a plurality of scales.

16. The non-transitory computer-readable storage medium as recited in claim 15, wherein, in said rotating and scaling the query object according to each combination of a plurality of rotation angles and a plurality of scales, the program instructions are computer-executable to implement, for each combination, applying the rotation angle and the scaling factor to each of the plurality of features relative to a center of the bounding box.

17. The non-transitory computer-readable storage medium as recited in claim 14, wherein, in said calculating a similarity score for each of the plurality of transforms with respect to a target image according to a spatially-constrained similarity measure, the program instructions are computer-executable to implement:
  matching two or more features in the target image to the plurality of features of the query object to generate two or more feature pairs;
  for each of the plurality of transforms:
    generating a voting map according to the feature pairs, wherein the voting map accumulates a voting score, calculated for each feature pair, for a translated location of a center of an object in the target image that matches the query object; and
    selecting the translated location for the center of the object with respect to the current transform according to the voting map; and
  wherein the accumulated voting score in each voting map indicates the similarity score for the respective transform.

18. The non-transitory computer-readable storage medium as recited in claim 17, wherein the program instructions are further computer-executable to implement, for each feature pair, calculating the voting score according to a tf-idf (term frequency-inverse document frequency) weighting technique.

19. The non-transitory computer-readable storage medium as recited in claim 14, wherein the program instructions are further computer-executable to implement:
  performing said calculating and said selecting for each of a plurality of images in an image collection, wherein the highest similarity score for each image determines a similarity value for the respective image with respect to the query image; and
  ranking the plurality of images according to the similarity values of the respective images with respect to the query image.

20. The non-transitory computer-readable storage medium as recited in claim 19, wherein the program instructions are further computer-executable to implement:
  generating a ranking of the plurality of images with respect to each of one or more nearest neighbor images as indicated by the ranking with respect to the query image; and
  re-ranking the plurality of images with respect to the query image according to the rankings with respect to the one or more nearest neighbor images.

* * * * *